(12) United States Patent
De Souza et al.

(10) Patent No.: US 11,772,997 B2
(45) Date of Patent: Oct. 3, 2023

(54) METHOD FOR EXTRACTING SALTS AND TEMPERATURE-REGENERATED EXTRACTING COMPOSITION

(71) Applicant: ADIONICS, Thiais (FR)

(72) Inventors: Guillaume De Souza, Prunoy (FR); Jacky Pouessel, Forges les Bains (FR); Bastien Dautriche, Angers (FR)

(73) Assignee: ADIONICS, Thiais (FR)

( * ) Notice: Subject to any disclaimer, the term of this patent is extended or adjusted under 35 U.S.C. 154(b) by 640 days.

(21) Appl. No.: 16/319,748

(22) PCT Filed: Jul. 21, 2017

(86) PCT No.: PCT/FR2017/052021
§ 371 (c)(1),
(2) Date: Jan. 22, 2019

(87) PCT Pub. No.: WO2018/015693
PCT Pub. Date: Jan. 25, 2018

(65) Prior Publication Data
US 2021/0214254 A1    Jul. 15, 2021

(30) Foreign Application Priority Data
Jul. 22, 2016  (FR) ...................... 1657078

(51) Int. Cl.
*C02F 1/68* (2023.01)
*C22B 3/44* (2006.01)
(Continued)

(52) U.S. Cl.
CPC ................ *C02F 5/10* (2013.01); *C02F 1/683* (2013.01); *C22B 3/381* (2021.05); *C22B 3/44* (2013.01);
(Continued)

(58) Field of Classification Search
CPC . B01D 11/0457; B01D 11/0492; C02F 1/683; C02F 2101/10; C02F 5/10;
(Continued)

(56) References Cited

U.S. PATENT DOCUMENTS 3,331,874 A    7/1967    Stecker
3,407,056 A    10/1968   Schwartz
(Continued)

FOREIGN PATENT DOCUMENTS

CH          609558          3/1979
CN       101559350 A       10/2009
(Continued)

OTHER PUBLICATIONS

Casnati et al., New Efficient Calixarene Amide Ionophores for the Selective Removal of Strontium Ion from Nuclear Waste: Synthesis, Complexation, and Extraction Properties, 123 J. Am. Chem. Soc., 12182, 12182-12190 (2001). (Year: 2001).*
(Continued)

*Primary Examiner* — Magali P Slawski
*Assistant Examiner* — Brad Gordon
(74) *Attorney, Agent, or Firm* — NIXON & VANDERHYE

(57) ABSTRACT

A temperature-regenerated hydrophobic liquid composition includes an extracting molecule of a non-alkaline cationic species, a solvating molecule of a complimentary anionic species and a fluidizing agent. The extracting molecule of a non-alkaline cationic species is a macrocycle of which the ring is formed from 24-32 carbon atoms and has the following formula (I) or (II): wherein -n is an integer ranging from 5 to 8, -p is 1 or 2, -m is 3 or 4, -q and t, which may be identical or different, are 0, 1 or 2, —R is a tert-butyl, tert-octyl, O-methyl, O-ethyl, O-propyl, O-isopropyl, O-butyl, O-isobutyl, O-pentyl, O-hexyl, O-heptyl, O-octyl,
(Continued)

or OCH$_2$Phenyl group or a hydrogen atom, and—R' and R", which may be identical or different, are chosen from methyl, ethyl, propyl, isopropyl, butyl, isobutyl, heptyl and octyl groups or R' and R" together form a pyrrolidine, piperidine or morpholine ring.

10 Claims, 5 Drawing Sheets

(51) Int. Cl.
    *C02F 5/10*     (2023.01)
    *C22B 3/38*     (2006.01)
    *C02F 101/10*     (2006.01)
    *C02F 103/10*     (2006.01)
    *C02F 103/36*     (2006.01)

(52) U.S. Cl.
    CPC ...... *C02F 2101/10* (2013.01); *C02F 2103/10* (2013.01); *C02F 2103/365* (2013.01); *C02F 2209/02* (2013.01); *C02F 2301/02* (2013.01)

(58) Field of Classification Search
    CPC ............ C02F 2103/10; C02F 2103/365; C02F 2209/02; C02F 2301/02; C22B 3/381; Y02P 10/20; Y02W 10/37; B01J 45/00
    See application file for complete search history.

(56) References Cited

U.S. PATENT DOCUMENTS

| | | | |
|---|---|---|---|
| 3,408,290 A | | 10/1968 | Scheibel |
| 4,275,234 A | | 6/1981 | Baniel et al. |
| 4,726,938 A | * | 2/1988 | Rollat .................. C01F 11/005 423/21.5 |
| 6,322,702 B1 | | 11/2001 | Moyer et al. |
| 6,566,561 B1 | * | 5/2003 | Bonnesen ............... C22B 26/10 568/812 |
| 9,376,330 B2 | | 6/2016 | De Souza |
| 2008/0014133 A1 | | 1/2008 | Glagolenko et al. |
| 2008/0179568 A1 | | 7/2008 | Meikrantz et al. |

FOREIGN PATENT DOCUMENTS

| | | | | |
|---|---|---|---|---|
| GB | | 1436306 | | 5/1976 |
| JP | | S55-147104 A | | 11/1980 |
| JP | | H08-127561 A | | 5/1996 |
| JP | | 2003-507359 A | | 2/2003 |
| JP | | 2015-200552 A | | 11/2015 |
| WO | | 00/29337 A1 | | 5/2000 |
| WO | | WO-0029337 A1 | * | 5/2000 ................ C02F 5/10 |
| WO | | 2010-086575 | | 8/2010 |
| WO | | 2011-077045 | | 6/2011 |

OTHER PUBLICATIONS

Pugia et al., Effect of Sidearm Length upon Competitive Alkali Metal Solvent Extraction into Chloroform by Liphophilic Crown Phosphonic Acid Monoalkyl Esters, 58 Anal. Chem., 2723, 2723-2726 (1986). (Year: 1986).*

Gulaboski et al., "A Comparative Study of the Anion Transfer Kinetics Across a Water/Nitrobenzene interface by Means of Elevtrochemical Impedance Spectroscopy and Square-Wave Voltammetry at Thin Organic Film-Modified Electrodes," Langmuir, Mar. 1, 2006, vol. 22, No. 7, pp. 3404-3412.

International Search Report, dated Oct. 27, 2017, from corresponding Application No. PCT/FR2017/052021.

French Search Report, dated Mar. 8, 2017, in Application No. FR 1657078.

Levitskaia, Tatiana G. et al., "Synergistic Pseudo-Hydroxide Extraction: Synergism and Anion Selectivity in Sodium Extraction Using a Crown Ether and a Series of Weak Lipophilic Acids," Anal. Chem. 2003, 75, 405-415.

Makrlik, Emanuel et al., "Solvent Extraction of Some Divalent Metal Cations into Nitrobenzene by Using a Synergistic Mixture of Strontium Dicarbollylcobaltate and p-tert-Butylcalix[4]arene-tetrakis (N,N-Diethylacetamide),".

Casnati, Alessandro et al., "Selective Complexation and Membrane Transport of Guanidinium Salts by Calix[6] arene Amides," Israel Journal of Chemistry, vol. 32, 1992, pp. 79-87.

Arnaud-Neu, Francoise et al., "Selective Alkali and Alkaline Earth Cation Complexation by Calixarene Amides," New J. Chem. 1991, 15, 33-37.

Norato, M.A. et al., "Demonstration of the Caustic-side Solvent Extraction Process for the Removal of 137Cs from Savannah River Site High Level Waste," Separation Science and Technology, vol. 38, Nos. 12 & 13, pp. 2647-2666, 2003.

Popov, Konstantin et al., "Guidelines for NMR Measurements for Determination of High and Low pKa Values," Pure Appl. Chem., vol. 79, No. 3, pp. 663-675, 2006.

\* cited by examiner

FIGURE 5

5 mL aqueous of NaCl or KCl at 0.1 M mixed with 5 mL of CH2Cl2/CHCl3 at 0.1 M of CEM and at 3.52K or 1M of ASM, at 20°C, until extraction equilibrium (2 hours).
Chloride salt extraction rate, according to the invention

| CEM | Upper rim | Macrocycle | n/m | n | α | Lower rim | Functional Group | Conformation | Cycle | ΔG° hyd (kJ/mol) | | Li+ | Na+ | K+ | Mg++ | Ca++ | Sr++ | Ba++ | Ca/Na | Sr/Na | Ba/Na | mean |
|---|---|---|---|---|---|---|---|---|---|---|---|---|---|---|---|---|---|---|---|---|---|---|
| | | | | | | | | | | | radii (pm) | 76 | 102 | 138 | 72 | 100 | 118 | 135 | 0.98 | 1.16 | 1.32 | 1.15 |
| | | | | | | | | | | | | -481 | -375 | -304 | -1833 | -1515 | -1386 | -1268 | 4.04 | 3.70 | 3.35 | 3.70 |
| 2 | tButyl | Calix | 6 | 1 | 0 | OCH2C(O)NEt2 | Amide | cone | 24 | %E (3.52 M ASM,2) | | 21.9% | 22.7% | 25.4% | 13.5% | 57.8% | 83.8% | 83.2% | 2.55 | 2.81 | 2.78 | 2.71 |
| 1 | tButyl | Calix | 4 | 1 | 0 | OCH2C(O)NEt2 | Amide | cone | 16 | %E (3.52 M ASM,2) | | 72.7% | 85.8% | 75.8% | 5.4% | 59.4% | 64.0% | 46.1% | 0.69 | 0.75 | 0.54 | 0.66 |
| 3 | tButyl | Calix | 4 | 1 | 0 | OCH2C(O)N(CH2)5 | Amide | cone | 16 | %E (1 M ASM,9) | | 39% | 53% | | | 53% | | | 0.54 | | | 0.54 |
| 4 | tButyl | Calix | 4 | 1 | 0 | OCH2C(O)N(CH2)4 | Amide | cone | 16 | %E (1 M ASM,9) | | 33% | 72% | | | 47% | | | 0.60 | | | 0.60 |
| 5 | tButyl | Calix | 4 | 1 | 0 | OCH2C(O)NPr2 | Amide | cone | 16 | %E (1 M ASM,9) | | 59% | 93% | | | 52% | | | 0.56 | | | 0.56 |
| 6 | tButyl | Calix | 4 | 1 | 0 | OCH2C(O)N(ETHP) | Amide | cone | 16 | %E (1 M ASM,9) | | 61% | 91% | | | 40% | | | 0.44 | | | 0.44 |
| 7 | tButyl | Calix | 4 | 1 | 0 | OCH2C(O)NiBu2 | Amide | cone | 16 | %E (1 M ASM,9) | | 65% | 88% | | | 35% | | | 0.40 | | | 0.40 |
| 8 | tButyl | Calix | 4 | 1 | 0 | OCH2C(O)NPy2 | Amide | cone | 16 | %E (1 M ASM,9) | | 67% | 76% | | | 25% | | | 0.33 | | | 0.33 |

METHOD FOR EXTRACTING SALTS AND TEMPERATURE-REGENERATED EXTRACTING COMPOSITION

TECHNICAL FIELD OF THE INVENTION

The technical field of the invention is the ionic extraction of salts, particularly of hydrophilic salts, applied to the treatment of industrial or natural saline waters.

PRIOR ART

Mining, oil or industrial activities may produce highly salty, very scaling and/or toxic metal-contaminated waste waters which need to be treated before being discharged into the environment, or even before being recirculated within an industrial process. In either case, nowadays, manufacturers only have very expensive solutions which are poorly or not adapted to their specific environment.

There are also cases, in particular for very scaling saline waters which are rich in alkaline-earth cations and/or which incorporate trace metals, for which, today, there is no technology for treating these waters sustainably and/or economically, thereby forcing to store these waters in settling tanks while waiting for a solution.

In the case of mixtures of waters from different springs or of very scaling waters, equipment is often scaled because of the precipitation of salts having a low solubility in water, such as some carbonate salts ($MgCO_3$, $CaCO_3$, $SrCO_3$, $BaCO_3$, $CdCO_3$, $CoCO_3$, $MnCO_3$, $PbCO_3$, $NiCO_3$, $FeCO_3$, $ZnCO_3$ . . . ), sulfate salts ($CaSO_4$, $SrSO_4$, $BaSO_4$, $PbSO_4$ . . . ), fluoride salts ($MgF_2$, $CaF_2$, $SrF_2$, $BaF_2$, $CdF_2$, $FeF_2$, $PbF_2$ . . . ), metallic hydroxide salts ($Mg(OH)_2$, $Ca(OH)_2$, $Cd(OH)_2$, $Co(OH)_2$, $Fe(OH)_2$, $Ni(OH)_2$, $Zn(OH)_2$ . . . ), and many others which can be present in high amount. Furthermore, if the technology used is associated with a thermal vaporization of this water, the temperature of use, which is generally greater than 80° C., then causes the lowering of precipitation threshold of some salts (for example, carbonate salts such as $CaCO_3$ through carbon dioxide evaporation) and of the salts having an inverse solubility (such as $CaSO_4$), which can limit the maximum water extraction level of salt water all the more or produce an even more abundant volume of solid waste to be managed.

In order to extract an ion or a salt which is present in a dissolved form in an industrial or natural water, the common approach consists in using the chemical way, for example, by ensuring the precipitation thereof, through adding a reagent, such as, for example, a base (NaOH . . . ), allowing the precipitation of metallic hydroxides, which are not soluble in water. This way is non-selective with respect to the precipitated metals and corresponds to a cation ($Na^+$ versus metal here) or anion exchange and causes other disadvantages, such as the addition of new contaminants to be treated downstream and a decrease in efficiency with a decrease in the concentration of the target compounds.

Another way through solvent extraction, known as a hydrometallurgical way, can also be implemented when it comes to entrapping metals such as Nickel, Cobalt . . . in higher concentration, through an exchange of cations $M^{n+}/nH^+$. These processes use cationic extracting agents which are dissolved in a solvent, implementing an acid-base chemistry or the extraction and the regeneration of the solvent occur at pHs differing by several orders of magnitude. Such a way thus uses expensive bases (NaOH . . . ) and acids ($H_2SO_4$ . . . ), resulting in the addition of new contaminants associated with the co-production of salts ($Na_2SO_4$ . . . ) to be managed downstream.

Another way which has also been implemented for more than 50 years consists in using selective electrodialysis membranes, that is to say membranes which are permeable to cations or to anions and not permeable to water and to neutral molecules in general. In this case, the consumed electrical energy is proportional to the salt which is moved, thereby limiting its use to high value-added applications in the case of brine treatment. This technology is not selective with respect to ions with the same charge and is thus not selective with respect to the metals or anions to be extracted, while being risky concerning membrane fouling.

Other ways exist, such as, for example, ion exchange where selectivity depends on the ion charge, is limited by the concentration of the ion which is treated, and producing there also a supply of new contaminants resulting from the chemical regeneration of the resins.

More recently, the applicant disclosed in application WO2010/086575 the use of fluorinated compounds in a direct contact exchanger comprising a liquid and hydrophobic fluorinated phase associated with ion exchangers. However, the liquid organic fluorinated phase described in this application describes the use of ionic and non-ionic organofluorinated compounds associated with a process which is poorly suitable for obtaining high water desalination rates or a selective desalination of salts and, in particular, a descaling because of an inadequate regeneration procedure.

Patent application US2008/179568A1 describes a process for liquid-liquid extraction of cesium and strontium at a low concentration using two types of molecules of cationic extracting agents, from the crown-ether family at a medium concentration and calixarenes at a very low concentration (from 0.0025 to 0.025 Mol/L) and at least one modifier dissolved in a diluent, such as a C12-C15 isoparaffinic hydrocarbon. The modifier can be an alcohol, a trioctylamine (TOA), tri-n-butyl phosphate (TBP) or their mixtures. This compound is intended to improve the capacities of the cationic extracting agent and/or its capacity to stay in a solubilized state during its implementation.

Patent application US2008/0014133 describes a process for liquid-liquid extraction of cesium and strontium at a low concentration by using molecules of cationic extracting agents from the crown-ether family at a low concentration (from 0.04 to 0.095 Mol/L), combined with a fluorinated alcohol (known as Fluoroheptanol $n_3$) at a high proportion (>80% by volume) and a glycol ether.

U.S. Pat. No. 6,566,561B1 describes a process for liquid-liquid extraction of cesium at a low concentration by using solvation agents and basic medium-stable phenoxy fluoro-alcohol-type phase modifiers, in the presence of molecules of cationic extracting agents from the calixarene-crown-ether family at a low concentration (from 0.001 to 0.20 Mol/L, preferably 0.01 Mol/L).

A wide range of literature exists in this field, which includes the article by T. G. Levitskaia, et al. Anal. Chem. 2003, 75, 405-412 which demonstrates that it is possible to extract soda (NaOH) from an aqueous solution by using a crown-ether-type sodium neutral extracting agent, with a deprotonable lipophilic weak acid so as to allow the formation of a hydrophobic sodium alkoxide.

This document also shows examples for extracting NaF, NaCl, NaBr, $NaNO_3$ and $NaClO_4$, at a salinity of 1 M, by combining DC18C6 at 0.02 M without, and then with seven weak acids (from the alcohol family), which are present at 0.04 M, the whole dissolved in nitrobenzene. Two of these alcohols are fluorinated aromatic alcohols the pKa of which is about 8.8. The salt extraction rate for hydrophobic ions, such as picrate, is relatively high. However, for hydrophilic anions, such as chloride ion Cl⁻, the recalculated salt extraction rates range from 0.06% to 0.16%, which confirms the great difficulty in extracting hydrophilic NaCl from water and the poor influence of alcohols, at this concentration, on the extraction performance.

Therefore, today, the industry seems to be waiting for a solution for treating brines, whether contaminated by metals or not, which is effective for extracting salts on a wide range of salinity and which is much less expensive in terms of investment and implementation.

It is also often expected to be able to separate the combinations of scaling ions, to remove them or to reduce the presence of specific salts and especially those which cause the scaling of this equipment by these waters and/or to value a part of these inorganic compounds which are present in these waters, in order to support all or part of this treatment.

The object of this patent application is thus to describe a new technology for treating saline waters and waters contaminated by metals, able to respond to these issues by its capacity to extract from water, selectively or massively, salts having a more or less high economic value for the treatment of industrial or natural saline waters. This technology will be able to be widely applied to allow the discharge of these waters into the environment, while respecting the ecosystems, for their promotion as process water, to provide a new or additional economic value within the scope of mining or oil operations or of recirculation of high value-added salts and/or metal cations. This new technology has also the advantage of not producing new contaminants because the ions are extracted from water in the form of salts of uncharged compound bodies which, then, are back-extracted from the extracting solvent by implementing a regeneration of the extracting agent through a thermal and non-chemical way.

DESCRIPTION OF THE INVENTION

In order to carry out the extraction of salts from an aqueous medium, the present application provides a process for deionizing water through liquid-liquid extraction with thermal regeneration using a liquid hydrophobic organic phase comprising, or consisting essentially of, or consisting of,
 at least one electrically neutral, organic and hydrophobic compound able to extract (for example, to solvate, to complex or to chelate) a cation of the salts to be extracted from the aqueous phase, known as CEM for Cation Extracting Molecule,
 at least a second electrically neutral, organic and hydrophobic compound able to solvate the anions of the salts to be extracted from the aqueous medium, known as ASM for Anion Solvating Molecule; and, optionally,
 a fluidizing agent, which is preferably hydrophobic.

Surprisingly, the association of the ASMs and the CEMs according to the invention allows the synergic extraction of neutral salts composed of hydrophilic cations and anions which are particularly difficult to transfer into an organic phase.

By the term "hydrophobic" is meant a compound, or a mixture of compounds, whose solubility in water, at 25° C., is at least less than 0.1 Mol/Liter. Preferably, hydrophobic compounds whose solubility in water, at 25° C., is less than 0.01 Mol/L, preferably less than 0.0001 Mol/L, and advantageously less than $1 \times 10^{-5}$ Mol/L are selected. The hydrophoby or the solubility in water of a compound may be measured by standard methods and, especially, by UV/visible spectroscopy.

CEM

A CEM compound as described in the present application, its mixtures and uses in a process for extracting a cationic species from a water containing said species as a process for deionizing water through liquid-liquid extraction with thermal regeneration for the extraction of at least one divalent cationic species and of at least one complementary anion, are also part of the invention.

The CEM, which allows the extraction of at least one cation, can be advantageously selected among the molecules having a good extraction capacity of alkaline-earth ions, as, for example, calcium, strontium or barium ions or other divalent cations depending on the need of separation. The extraction is possible because of a replacement of the solvation of the cations and anions by water with a solvation thereof by the extracting composition which thus allows an interaction with the CEMs and the ASMs. The nature of the interactions covers phenomena such as ion-dipole interactions, accompanied by the creation of hydrogen bonds and electrostatic interactions, or even van der Waals bonds. Preferably, the CEM is a compound allowing to complex and, in particular, to chelate the cation. The "chelate" differentiates itself from the simple "complex" in that the cation is attached to the chelating ligand by at least two bonds/interactions.

The CEMs to be considered for the selective extraction of divalent cations with respect to monovalent alkaline metal cations are macrocycles from the metacyclophane (MCP) family which have a hydrophobic cavity described by n phenol-type aromatic rings. The size of the macrocycle varies from 24 to 32 atoms, in particular carbon atoms. Preferably, the size of the macrocycle is from 24 to 28 carbon atoms.

These phenol-type aromatic rings can be linked to each other in the ortho-position of the hydroxy function either directly or by 1-carbon methylene bridges (—CH$_2$—) or by 2-carbon bridges (—CH$_2$CH$_2$—) or by 3-carbon bridges (—CH$_2$CH$_2$CH$_2$—). If only direct bonds are implemented, the common name of these macrocycles is [0$_n$]-type Spherand. If only 1-carbon methylene bridges (—CH$_2$—) are implemented, the common name of these macrocycles is [1$_n$]-type Calixarenes. If only 2-carbon bridges (—CH$_2$CH$_2$—) are implemented, the common name of these macrocycles is [2$_n$]-type all-homocalixarene. The size of the bridges may also vary within the same macrocycle and vary from 0 to 3 carbon atoms. The nomenclature specifies such a variety by naming them, for example, [1.3.1.3]MCP or [1.3]$_2$MCP for a macrocycle having 4 aromatic rings which are linked to each other in the ortho-position by successively one methylene bridge, then by one 3-carbon bridge, then again by one methylene bridge and, finally, by one 3-carbon bridge so as to complete the cycle.

The macrocycles of interest are then functionalized with non-hydrogenated amide groups for the selective extraction of the alkaline earths, without being also selective for the extraction of the divalent transition metals.

Thus, a CEM allowing to achieve the selective extraction of non-alkaline cations, in particular divalent ones, with respect to alkaline cations, in particular monovalent ones, is a macrocycle, the cycle of which is formed from 24 to 32 carbon atoms, functionalized with amide groups, and having the following formulae (I) or (II):

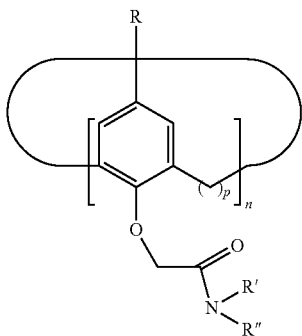
(I)

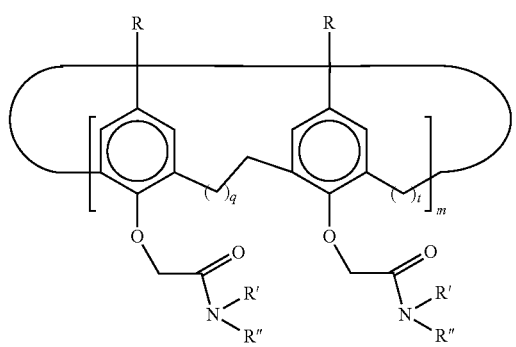
(II)

where n is an integer from 5 to 8, p is 1 or 2, m is 3 or 4, q and t, identical or different, are 0, 1 or 2, R is a tert-butyl, tert-pentyl, tert-octyl, O-methyl, O-ethyl, O-propyl, O-isopropyl, O-butyl, O-isobutyl, O-pentyl, O-hexyl, O-heptyl, O-octyl, $OCH_2$Phenyl group, or a hydrogen atom, R' and R", identical or different, are selected from the group constituted by methyl, ethyl, propyl, isopropyl, butyl, isobutyl, pentyl, hexyl, heptyl and octyl groups, or R' and R" together form a pyrrolidine, piperidine or morpholine ring.

Thus, for compounds of formula (I), integers n and p should be selected such that $24 \leq (3+p) \times n \leq 32$. For compounds of formula (II), integers m, q and t should be selected such that $24 \leq (7+q+t) \times m \leq 32$.

Such molecules belong to the metacyclophane family.

Advantageously, the CEM is a molecule of formula:

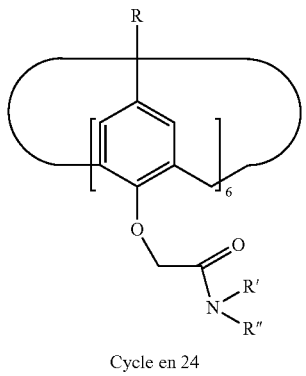
Cycle en 24

(from the calix[6]arene family, of $[1_6]$-type), where R, R' and R" are as defined above for formulae (I) and (II). When R' and R" are both an ethyl group, the selective extraction of divalent cations is particularly strong, in particular when the radical R is tert-butyl, $OCH_2$Ph, H or O-methyl.

Advantageously, the CEM is a molecule of formula:

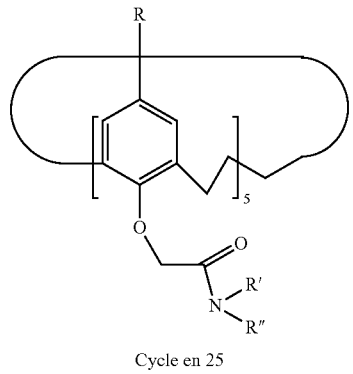
Cycle en 25

(from the All-homocalix[5]arene family, of $[2_5]$-type), where R, R' and R" are as defined above for formulae (I) and (II).

Advantageously, the CEM is a molecule of formula:

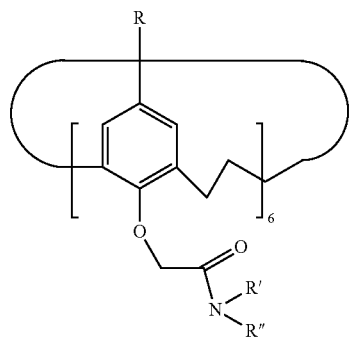
Cycle en 30

(from the All-homocalix[6]arene family, of $[2_6]$-type), where R, R' and R" are as defined above for formulae (I) and (II).

Advantageously, the CEM is a molecule of formula:

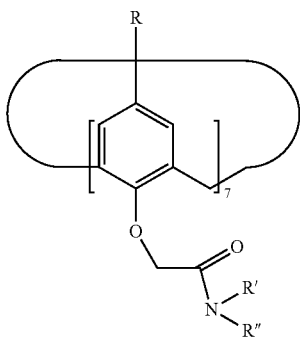

Cycle en 28

(from the Calix[7]arene family, of [1₇]-type),
where R, R' and R" are as defined above for formulae (I) and (II).

Advantageously, the CEM is a molecule of formula:

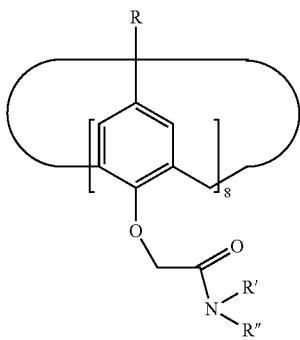

Cycle en 32

(from the Calix[8]arene family, of [1₈]-type),
where R, R' and R" are as defined above for formulae (I) and (II). When R' and R" are both an ethyl group, the selective extraction of the divalent cations is particularly interesting, in particular when the radical R is tert-butyl, OCH₂Phenyl, H or O-methyl.

Advantageously, the CEM is a molecule of formula:

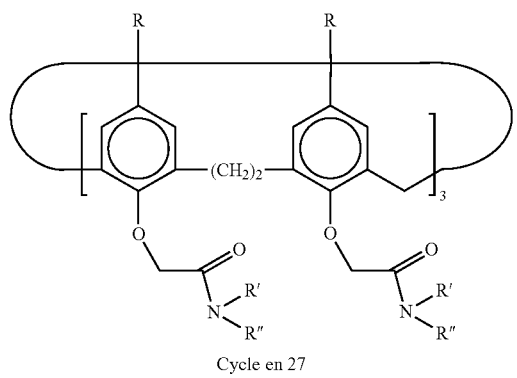

Cycle en 27

(of [2.1.2.1.2.1]MCP or [2.1]₃MCP-type),
where R, R' and R" are as defined above for formulae (I) and (II).

Advantageously, the CEM is a molecule of formula:

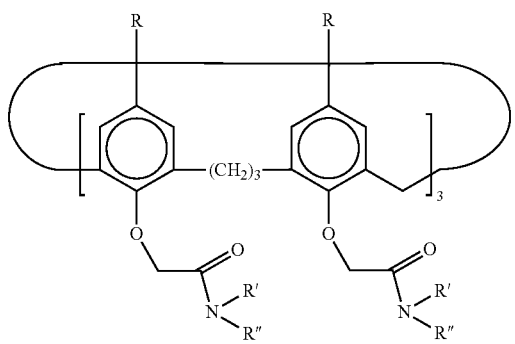

Cycle en 30

(of [3.1.3.1.3.1]MCP or [3.1]₃MCP-type),
where R, R' and R" are as defined above for formulae (I) and (II).

Advantageously, the CEM is a molecule of formula:

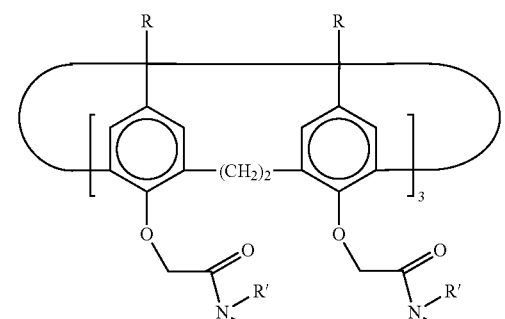

Cycle en 24

(of [2.0.2.0.2.0]MCP or [2.0]₃MCP-type),
where R, R' and R" are as defined above for formulae (I) and (II).

Advantageously, the CEM is a molecule of formula:

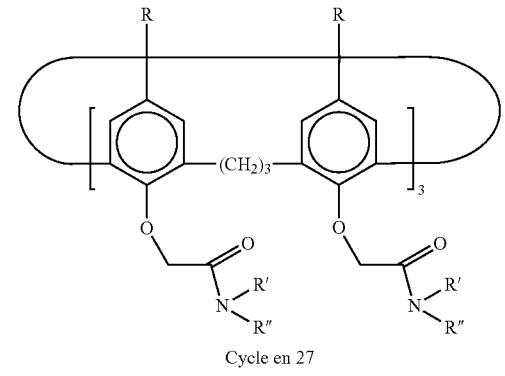

Cycle en 27

(of [3.0.3.0.3.0]MCP or [3.0]₃MCP-type),
where R, R' and R" are as defined above for formulae (I) and (II).

Advantageously, the CEM is a molecule of formula:

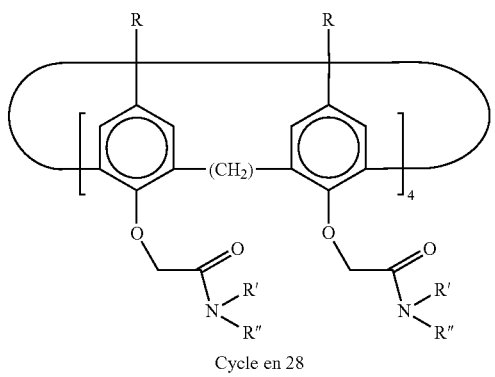

Cycle en 28

(of [1.0.1.0.1.0.1.0]MCP or [1.0]$_4$MCP-type),
where R, R' and R" are as defined above for formulae (I) and (II).

Advantageously, the CEM is a molecule of formula:

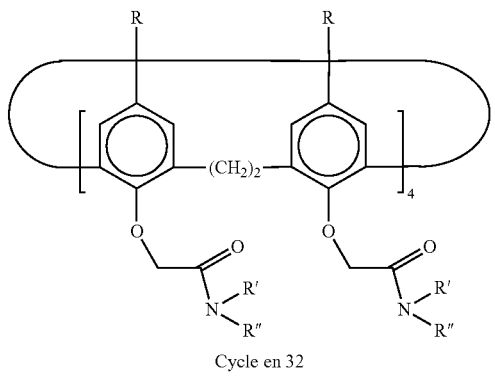

Cycle en 32

(of [2.0.2.0.2.0.2.0]MCP or [2.0]$_4$MCP-type),
where R, R' and R" are as defined above for formulae (I) and (II).

In formulae (I) and (II):
Particularly advantageously, group R is tert-butyl.
Particularly advantageously, groups R' and R" are both an ethyl group.
Particularly advantageously, group R is tert-butyl or a hydrogen atom.
Particularly advantageously, the CEM is the compound of formula:

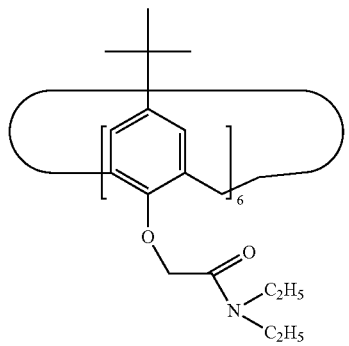

(from the Calix[6]arene family, of [1$_6$]-type and of CAS number: 111786-95-9). This CEM2 is particularly effective for the selective extraction of hydrophilic alkaline-earth salts, in particular chloride salts, from an aqueous solution when they are combined with at least one ASM and optionally with a fluidizing agent within a liquid-liquid extraction process with thermal regeneration of the liquid resin, according to the invention.

Molecules belonging to these families of formula (I) are already identified by a CAS number, in particular they are the following Cation Extracting Molecules:

| CAS # | R | Macrocycle | p | n | R' | R" |
|---|---|---|---|---|---|---|
| 136534-29-7 | tert-Butyl | Calixarene | 1 | 6 | Pyrrolidinyl | |
| 111786-95-9 | tert-Butyl | Calixarene | 1 | 6 | Ethyl | Ethyl |
| 385376-74-9 | O-Octyl | Calixarene | 1 | 6 | Ethyl | Ethyl |
| 327154-32-5 | OCH2Phenyl | Calixarene | 1 | 6 | Ethyl | Ethyl |
| 185330-54-5 | H | Calixarene | 1 | 6 | Ethyl | Ethyl |
| 327154-34-7 | O-methyl | Calixarene | 1 | 6 | Ethyl | Ethyl |
| 315191-66-1 | tert-Butyl | Calixarene | 1 | 8 | Ethyl | Ethyl |
| 327154-36-9 | O-Octyl | Calixarene | 1 | 8 | Ethyl | Ethyl |
| 193743-58-7 | OCH2Phenyl | Calixarene | 1 | 8 | Ethyl | Ethyl |
| 327154-37-0 | H | Calixarene | 1 | 8 | Ethyl | Ethyl |
| 315191-06-1 | O-methyl | Calixarene | 1 | 8 | Ethyl | Ethyl |

The composition according to the invention may also comprise more than one CEM compound allowing the extraction of at least one cation, that may be advantageously selected from the compounds described in the present application.

Another object of the invention relates to the use of these CEM compounds for the extraction of salts and/or ions from an aqueous medium. Particularly, these compounds may be used, individually or mixed together, in a composition or in a process according to the invention as described in the present application.

Another object of the invention relates to the use of macrocycle-type CEM compounds the cycle size of which ranges from 16 to 22 atoms, in particular, carbon atoms, and functionalized with amide groups, for the extraction of salts and, in particular, of hydrophilic anion salts, such as chloride salts. Especially, these compounds, associated with the ASM according to the invention, allow the massive extraction from a solution containing a mixture of such salts, for example, of chloride salts, comprising different cations having a ionic radius ranging from 55 pm to 180 pm, advantageously from 70 pm to 167 pm, more particularly from 75 pm to 167 pm. Such cations are especially lithium, sodium, potassium, rubidium or cesium cations, which are monovalent, or calcium, strontium or barium cations, which are divalent, even transition metal cations. It should be noted that magnesium, which is a 72 pm ionic radius divalent cation, is an exception and is not considered as being sufficiently extractable so that these CEMs may be used industrially with the aim of extracting it from water.

These compounds are compounds of generic formulae (III) and (IV):

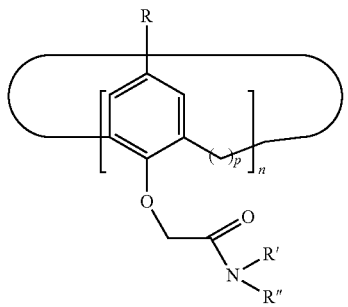

(III)

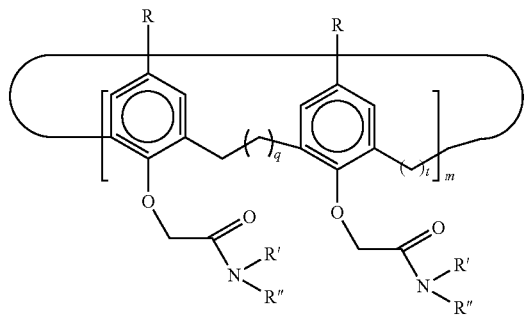

(IV)

where n is 4 or 5, p is 1 or 2, m is 2 or 3, q and t, identical or different, are 0, 1 or 2, R is a tert-butyl, tert-pentyl, tert-octyl, O-methyl, O-ethyl, O-propyl, O-isopropyl, O-butyl, O-isobutyl, O-pentyl, O-hexyl, O-heptyl, O-octyl, OCH$_2$Phenyl group, or a hydrogen atom, R' and R", identical or different, are selected from the group constituted by methyl, ethyl, propyl, isopropyl, butyl, isobutyl, pentyl, hexyl, heptyl and octyl groups, or R' and R" together form a pyrrolidine, piperidine or morpholine ring.

Thus, for compounds of formula (III), integers n and p should be selected such that $16 \leq (3+p) \times n \leq 22$. For compounds of formula (IV), integers m, q and t should be selected such that $16 \leq (7+q+t) \times m \leq 22$.

In particular, macrocycle CEM1 of formula III where n=4, R=tert-butyl and R'=R"=ethyl and of CAS #114155-16-7, in its cone-type configuration, is particularly effective for the massive or global extraction of hydrophilic salts, in particular chloride salts, from an aqueous solution when it is combined with at least one ASM and optionally with a fluidizing agent within a liquid-liquid extraction process with thermal regeneration of the liquid resin, according to the invention.

Molecules belonging to these families of formulae (III) and (IV) are already identified by a CAS number, in particular they are the following CEMs:

| CAS # | R | Macrocycle | p | n | R' | R" | Configuration |
|---|---|---|---|---|---|---|---|
| 150588-24-2 | H | Calixarene | 1 | 4 | Ethyl | Ethyl | cone |
| 412334-02-2 | H | Calixarene | 1 | 4 | Butyl | Butyl | cone |
| 1558817-92-7 | H | Calixarene | 1 | 4 | Morpholinyl | | cone |
| 149635-98-3 | H | Calixarene | 1 | 4 | piperidinyl | | cone |
| 145237-45-2 | tert-Butyl | Calixarene | 1 | 4 | Methyl | Methyl | cone |
| 114155-16-7 | tert-Butyl | Calixarene | 1 | 4 | Ethyl | Ethyl | cone |
| 162714-60-5 | tert-Butyl | Calixarene | 1 | 4 | Propyl | Propyl | cone |
| 116906-60-6 | tert-Butyl | Calixarene | 1 | 4 | Butyl | Butyl | cone |
| 162714-61-6 | tert-Butyl | Calixarene | 1 | 4 | Pentyl | Pentyl | cone |
| 162714-62-7 | tert-Butyl | Calixarene | 1 | 4 | Hexyl | Hexyl | cone |
| 162714-63-8 | tert-Butyl | Calixarene | 1 | 4 | Octyl | Octyl | cone |
| 162714-67-2 | tert-Butyl | Calixarene | 1 | 4 | Ethyl | CH2-Ph | cone |
| 353236-42-7 | tert-Butyl | Calixarene | 1 | 4 | Methyl | Heptyl | cone |
| 171800-66-1 | tert-Butyl | Calixarene | 1 | 5 | Ethyl | Ethyl | cone |
| 133801-01-1 | tert-Butyl | Calixarene | 1 | 4 | pyrrolidinyl | | cone |
| 353236-41-6 | tert-Butyl | Calixarene | 1 | 4 | piperidinyl | | cone |
| 353236-67-6 | tert-Butyl | Calixarene | 1 | 4 | morpholinyl | | cone |

For calixarenes, cone-type and even partial cone-type cycle configurations should be chosen rather than alternating 1,2-type or alternating 1,3-type configurations, without excluding these alternating configurations.

Other 20-carbon metacyclophane-type cycles are identified:

| CAS # | R | Macrocycle | t | q | m | R' | R" | Configuration |
|---|---|---|---|---|---|---|---|---|
| 353742-72-0 | tert-butyl | MCP[1.3]2 | 1 | 2 | 2 | Ethyl | Ethyl | Alternating 1, 4 |
| 352742-73-1 | tert-butyl | MCP[1.3]2 | 1 | 2 | 2 | Methyl | Methyl | Alternating 1, 4 |
| 353742-74-2 | tert-butyl | MCP[1.3]2 | 1 | 2 | 2 | Butyl | Butyl | Alternating 1, 4 |

In one preferential aspect of the invention, the CEM of formula (III) or (IV) has a complexing constant Log K, in methanol at 25° C., of the cationic species to be extracted, higher than 3 and less than 11, preferably higher than 5 and less than 9.

These amide-type CEMs are particularly well-adapted to the liquid-liquid extraction process via temperature difference according to the invention.

Another object of the invention relates to the use of CEM compounds functionalized with ester or ketone groups for the selective extraction of the alkaline cations, with respect to the alkaline-earth cations, without being selective for the extraction of monovalent transition metals (Silver Ag$^+$). Particularly, these compounds may be used, individually or mixed together, in a composition or in a process according to the invention as described in the present application.

Another object of the invention relates to the use of macrocycle-type CEM compounds the cycle size of which ranges from 16 to 24 atoms, in particular, carbon atoms, and functionalized with ester or ketone groups, for the selective extraction of alkaline salts and, in particular, of hydrophilic anion alkaline salts, such as chloride salts. Especially, these compounds, associated with the ASM according to the invention, allow the selective extraction of one or more alkaline salts from a solution containing a mixture of such salts, for example, chloride salts, comprising different cations having a ionic radius ranging from 55 pm to 180 pm, advantageously from 70 pm to 167 pm. Such cations are especially lithium, sodium, potassium, rubidium and cesium cations, which are monovalent, or calcium, strontium, barium cations, which are divalent, even transition metal cations.

These compounds are compounds of generic formulae (V) and (VI):

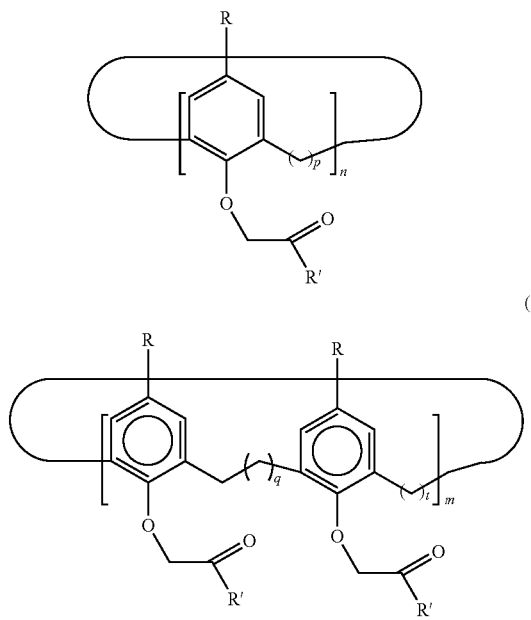

where
n is 4, 5 or 6
p is 1 or 2,
m is 2 or 3,
q and t, identical or different, are 0, 1 or 2,
R is a tert-butyl, tert-pentyl, tert-octyl group, or a hydrogen atom,
R' is selected from the group constituted by methyl, ethyl, propyl, isopropyl, butyl, isobutyl, pentyl, hexyl, heptyl and octyl groups, in order to make a ketone-type binding group, or R' is selected from the group consisting of O-methyl, O-ethyl, O-propyl, O-isopropyl, O-butyl, O-isobutyl, O-pentyl, O-hexyl, O-heptyl, O-octyl, OCH$_2$Phenyl groups in order to make an ester-type binding group.

Thus, for compounds of formula (V), integers n and p should be selected such that $16 \leq (3+p) \times n \leq 24$. For compounds of formula (VI), integers m, q and t should be selected such that $16 \leq (7+q+t) \times m \leq 24$.

In particular, macrocycle CEM10 of formula (V) where n=4, R=tert-butyl and R'=O-ethyl and of CAS #97600-39-0, in its cone-type configuration, is particularly effective for the selective extraction of sodium salts, in particular as sodium chloride salt, from an aqueous solution when it is combined with at least one ASM and optionally with a fluidizing agent within a liquid-liquid extraction process with thermal regeneration of the liquid resin, according to the invention.

In particular, macrocycles CEM11 of formula (V) where n=5, R=tert-butyl and R'=O-ethyl and of CAS #152495-34-6, and CEM12 of formula (V) where n=6, R=tert-butyl and R"=O-ethyl and of CAS #97600-45-8, in their cone-type configurations, are particularly effective for the selective extraction of alkaline salts with respect to the alkaline-earth salts, in particular as alkaline chloride salts, from an aqueous solution when it is combined with at least one ASM and optionally with a fluidizing agent within a liquid-liquid extraction process with thermal regeneration of the liquid resin, according to the invention. CEM11 is suitable for extracting alkaline chloride salts more globally (except for lithium) whereas CEM12, for a larger cycle diameter of 24, has the capacity to extract alkalis preferably with a large diameter (cesium, rubidium, even potassium).

Molecules belonging to these families of formulae (V) and (VI) are already identified by a CAS number, in particular they are the following CEMs:

| CAS # | R | Macrocycle | p | n | R' | Configuration |
|---|---|---|---|---|---|---|
| 97600-43-6 | H | Calixarene | 1 | 4 | O-Ethyl | cone |
| 144508-85-0 | H | Calixarene | 1 | 4 | O-Iso-propyl | cone |
| 144508-84-9 | H | Calixarene | 1 | 4 | O-Tert-butyl | cone |
| 97600-39-0 | tert-butyl | Calixarene | 1 | 4 | O-Ethyl | cone |
| 160617-97-0 | tert-butyl | Calixarene | 1 | 4 | O-Iso-propyl | cone |
| 94530-27-5 | tert-butyl | Calixarene | 1 | 4 | O-Tert-butyl | cone |
| 149775-74-6 | tert-octyl | Calixarene | 1 | 4 | O-Ethyl | cone |
| 152495-34-6 | tert-butyl | Calixarene | 1 | 5 | O-Ethyl | cone |
| 123311-70-6 | tert-butyl | Calixarene | 1 | 4 | Tert-butyl | cone |

For calixarenes, cone-type and even partial cone-type cycle configurations should be chosen rather than alternating 1,2-type or alternating 1,3-type configurations, without for all that being exclusive.

According to one preferred embodiment, the composition does not comprise a CEM of formula (V) or (VI) allowing the extraction of calcium ions, that is to say whose complexing constant Log K(Ca$^{++}$), in methanol at 25° C., is higher than 3. In one preferential aspect of the invention, the CEM of formula (V) or (VI) has a complexing constant Log K, in methanol at 25° C., of the cationic species to be extracted, higher than 3 and less than 11, preferably higher than 5 and less than 9. Furthermore, in the case of selective CEMs for the extraction of alkaline cationic species, its Log K, in methanol at 25° C., can be less than 5, preferably less than 3 for alkaline-earth cations, and in particular for calcium.

These ester or ketone-type CEMs, of formula (V) or (VI), are particularly well-adapted to the liquid-liquid extraction process via temperature difference according to the invention.

ASM Compound

The ASM can be a compound comprising from 6 to 50 carbon atoms, advantageously from 7 to 30 carbon atoms, and especially from 8 to 20 carbon atoms, and including at least one aromatic ring and at least one halogen atom or an electron-withdrawing group, in particular a fluorinated one.

Advantageously, the ASM is a compound of formula B:

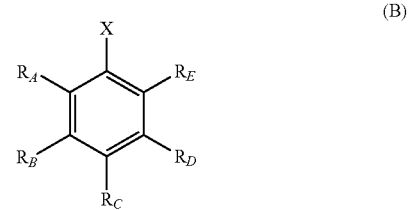

in which at least any one of radicals $R_A$, $R_B$, $R_C$, $R_D$ and $R_E$, identical or different, is a halogen atom or an electron-withdrawing group, in particular a halogenated radical, from the following group:

F, Cl, Br,
$C_mF_{2m+1}$ with $m \leq 4$, where m is a non-zero integer, $CF_2CF_2C_pH_{2p+1}$ with $p \leq 4$, where p is an integer,
$CF_2C_pH_{2p+1}$ with $p \leq 4$, where p is an integer,
$CH_2C_pF_{2p+1}$ with $p \leq 4$, where p is an integer,
$OCH_2CF_3$,
$C(=O)CF_3$,
$C_mH_nF_pCl_qBr_s$ with $m \leq 4$, where n, p, q, s are integers among which at least p, q or s is not zero,
$C(=O)OC_mH_{2m+1}$ with $m \leq 4$, where m is an integer, and
$C(=O)C_mH_{2m+1}$ with $m \leq 4$, where m is an integer,
the one or more remaining radicals $R_A$, $R_B$, $R_C$, $R_D$ and $R_E$ are selected, identical or different, from the following non-electron-withdrawing radicals:
H,
$CH_3$,
$CH_2CH_3$,
$CH_2CH_2C_pF_{2p+1}$ with $p \leq 4$, where p is an integer,
$C_mH_{2m-1}$ with $3 \leq m \leq 10$, where m is an integer, and
$C_mH_{2m+1}$ with $3 \leq m \leq 10$, where m is an integer;
where only one of radicals $R_A$ to $R_E$ may be one of these last two radicals $C_mH_{2m-1}$ and $C_mH_{2m+1}$;
and wherein X is selected from the following radicals:
OH,
NH—R',

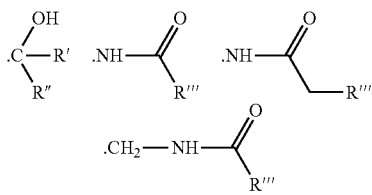

where R' and R", identical or different, are selected from the following radicals
H,
$C_nH_{2n-1}$ with $3 \leq n \leq 4$, where n is an integer,
$C_nH_{2n+1}$ with $n \leq 4$, where n is a non-zero integer,
$CH_2CH_2C_pF_{2p+1}$ with $p \leq 2$, where p is an integer,
$CH_2C_pF_{2p+1}$ with $p \leq 2$, where p is an integer,
and an aryl radical of formula b:

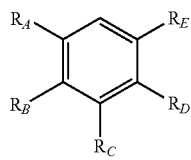

where $R_A$, $R_B$, $R_C$, $R_D$ and $R_E$, identical or different, are as defined above in formula B;
and in which R''' is selected from the following radicals:
$C_mH_{2m+1}$ with $m \leq 20$, preferably $\leq 15$, where m is an integer,
$C_mH_{2m-1}$ with $3 \leq m \leq 20$, where m is an integer,
$C_mH_nF_pCl_qBr_s$ with $m \leq 10$, where n, p, q, s are integers among which at least p, q or s is not zero,
$CH_2CH_2C_pF_{2p+1}$ with $p \leq 4$, where p is an integer,
$CH_2C_pF_{2p+1}$ with $p \leq 4$, where p is an integer,
$CF_2C_pH_{2p+1}$ with $p \leq 4$, where p is an integer,
$CF_2CF_2C_pH_{2p+1}$ with $p \leq 4$, where p is an integer,
$C_mF_{2m+1}$ with $m \leq 4$, where m is a non-zero integer,
and an aryl radical of formula b:

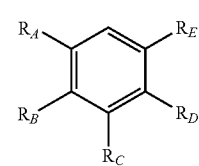

where $R_A$, $R_B$, $R_C$, $R_D$ and $R_E$, identical or different, are as defined above in formula B.

ASM Compound—Alcohol

Such a compound is advantageously selected from the group of fluorinated aromatics with an alcohol function and their derivatives. For example, this compound may be an alcohol derived from a methanolic phenyl, such as 3-(trifluoromethyl)benzyl alcohol (CAS #: 349-75-7).

Preferably, this first compound is a methanolic phenyl compound which advantageously comprises more than 3 fluorine atoms. Advantageously, this compound comprises at least two radicals —$CF_3$.

According to one embodiment of the invention, this first ASM compound has, as radical X in formula B:

which corresponds to a compound of formula A:

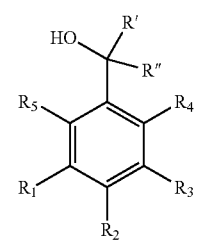

in which
$R_1$, $R_2$, $R_3$, $R_4$ and $R_5$, identical or different, but where any one of $R_1$, $R_2$ and $R_3$ is a fluorinated radical, are selected from the following radicals:
H,
F,
$C_mF_{2m+1}$ with $m \leq 4$, where m is a non-zero integer,
$CF_2CF_2C_pH_{2p+1}$ with $p \leq 4$, where p is an integer, and
$CF_2C_pH_{2p+1}$ with $p \leq 4$, where p is an integer;
and in which R' and R", identical or different, are selected from the following radicals:
H
$C_nH_{2n-1}$ with $3 \leq n \leq 4$, where n is an integer,
$C_nH_{2n+1}$ with $n \leq 4$, where n is a non-zero integer,
$CH_2C_pF_{2p+1}$ with $p \leq 2$, where p is an integer,
$CH_2CH_2C_pF_{2p+1}$ with $p \leq 2$, where p is an integer, and an aryl radical of formula a:

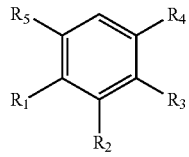

where $R_1$, $R_2$, $R_3$, $R_4$ and $R_5$, identical or different, are selected from the group
H
F
$C_mF_{2m+1}$ with $m \leq 4$,
$CF_2CF_2C_pH_{2p+1}$ with $p \leq 4$, where p is an integer,
$CF_2C_pH_{2p+1}$ with $p \leq 4$, where p is an integer.

ASM Compounds—Alcohol

Advantageously, said first compound is selected from the group consisting in the compounds described in Table I below:

TABLE I

| Alcohol ASM. Semi-developed formula | Empirical formula CAS # | Molar mass (g/mol) | Density (g/cm3) | [ASM] maximum Mol/L | Solubility in water mMol/L | pKa |
|---|---|---|---|---|---|---|
| ASM1 | C8H7F3O 349-75-7 | 176.14 | 1.29 Liquid | 7.32 | 32 | 14.6 +/− 1.0 (estimated) |
| ASM2 | C9H6F6O 32707-89-4 | 244.13 | 1.43 Solid | 5.86 | 2.29 | 14.5 +/− 1.0 (estimated) |
| ASM3 | C15H6F1O 916975-23-0 | 544.18 | 1.62 | 2.98 | 0.0005 | 14.01 +/− 0.1 |
| ASM4 | C10H5F9O 1010101-84-4 | 312.13 | 1.53 | 4.90 | 0.39 | 13.59 +/− 0.1 |

TABLE I-continued

| Alcohol ASM. Semi-developed formula | Empirical formula CAS # | Molar mass (g/mol) | Density (g/cm3) | [ASM] maximum Mol/L | Solubility in water mMol/L | pKa |
|---|---|---|---|---|---|---|
| ASM5 | C11H9F7O 131608-30-5 | 290.18 | 1.39 | 4.70 | 0.42 | 14.5 +/− 1.0 (estimated) |
| ASM7 | C12H12F6O 742097-71-8 | 286.21 | 1.30 Liquid | 4.54 | 0.48 | 13.9 +/− 1.0 (estimated) |
| ASM8 | C15H10F6O 1598-89-6 | 320.23 | 1.37 Liquid | 4.28 | 0.07 | 13.3 +/− 1.0 (estimated) |

According to one aspect of the invention, the hydrophobic organic liquid composition comprises at least one compound allowing the solvation of at least one anion. Preferably, these compounds are selected from ASM-type compounds described in the present application.

Particularly, the liquid composition according to the invention may comprise a solid form of ASM, such as [3,5-Bis(Trifluoromethyl)phenyl]methanol (CAS #: 32707-89-4) combined with a fluidizing agent or a hydrophobic liquid diluent.

Alternately, the liquid composition according to the invention may comprise a solid ASM (at the operating temperatures), such as [3,5-Bis(Trifluoromethyl)phenyl] methanol (CAS #: 32707-89-4), associated with a liquid ASM (at the operating temperatures), such as [(Trifluoromethyl)phenyl]methanol (CAS #: 349-75-7). In this case, ASM1 in a liquid form serves a dual function as an ASM and as a fluidizing agent/diluent. The relative volume proportion of these compounds relative to each other may vary, but is advantageously in a ratio ranging from 30/70 to 60/40 volume/volume (v/v). Preferably, this ratio is about 40/60 v/v, in particular for the combination ASM1/ASM2.

ASM Compounds—Amide

Such a compound is advantageously selected from the group of fluorinated aromatics with an amide function and their derivatives. The ASM compound of formula B may also be an amide compound. In this case, the radical X in formula B is:

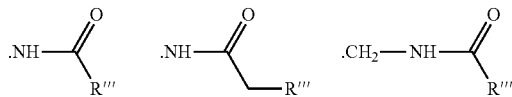

where R''' is as described above.
Preferably, the amide has the formula:

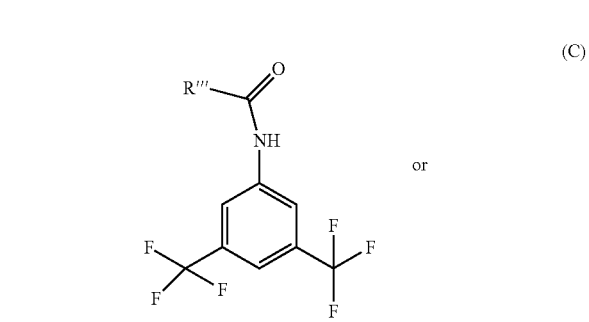

(C)

or

-continued

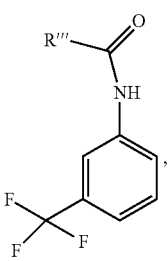
(D)

in which R''' is selected from the following radicals:
  $C_mH_{2m+1}$ with m≤20, preferably ≤15 where m is an integer,
  $C_mH_{2m-1}$ with 3≤m≤20, where m is an integer,
and an aryl radical of formula b:

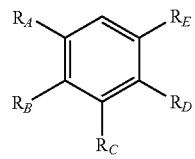
(b)

in which at least any one of radicals $R_A$, $R_B$, $R_C$, $R_D$ and $R_E$, identical or different, is a halogen atom or an electron-withdrawing group, in particular a halogenated radical, from the following group:
  F, Cl, Br,
  $C_mF_{2m+1}$ with m≤4, where m is a non-zero integer,
  $CF_2CF_2C_pH_{2p+1}$ with p≤4, where p is an integer,
  $CF_2C_pH_{2p+1}$ with p≤4, where p is an integer,
  $CH_2C_pF_{2p+1}$ with p≤4, where p is an integer,
  $OCH_2CF_3$,
  $C(=O)CF_3$,
  $C_mH_nF_pCl_qBr_s$ with m≤4, where n, p, q, s are integers among which at least p, q or s is not zero,
  $C(=O)OC_mH_{2m+1}$ with m≤4, where m is an integer, and
  $C(=O)C_mH_{2m+1}$ with m≤4, where m is an integer,
the one or more remaining radicals $R_A$, $R_B$, $R_C$, $R_D$ and $R_E$ are selected, identical or different, from the following non-electron-withdrawing radicals:
  H,
  $CH_3$,
  $CH_2CH_3$,
  $CH_2CH_2C_pF_{2p+1}$ with p≤4, where p is an integer,
  $C_mH_{2m-1}$ with 3≤m≤10, where m is an integer, and
  $C_mH_{2m+1}$ with 3≤m≤10, where m is an integer;
where only one of radicals $R_A$ to $R_E$ may be one of these last two radicals $C_mH_{2m-1}$ and $C_mH_{2m+1}$.
Preferably, the radical R''' is a linear or non-linear alkyl chain, and, in particular, a radical n-$C_7H_{15}$, n-$C_9H_{19}$, n-$C_{11}H_{23}$ or n-$C_{13}H_{27}$.

These amide-type compounds are particularly adapted to the liquid-liquid extraction process with thermal regeneration according to the invention. Other compounds of this type which may be used as an ASM for extracting compositions according to the invention are for example:
N-[3,5-Bis(trifluoromethyl)phenyl]acetamide (CAS #16143-84-3),
N-[3,5-Bis(trifluoromethyl)phenyl]-2-chloroacetamide (CAS #790-75-0),
N-[3,5-Bis(trifluoromethyl)phenyl]-2-bromoacetamide (CAS #99468-72-1),
N-[3,5-Bis(trifluoromethyl)phenyl]-2-chlorobenzamide (CAS #56661-47-3),
N-[3,5-Bis(trifluoromethyl)phenyl]-4-chlorobenzamide (CAS #56661-30-4),
N-[3,5-Bis(trifluoromethyl)phenyl]-4-bromobenzamide (CAS #56661-31-5),
N-[3,5-dichlorophenyl]acetamide (CAS #31592-84-4),
N-[4-methyl-3,5-dichlorophenyl]acetamide (CAS #39182-94-0),
N-[3-fluoro-5-(trifluoromethyl)phenyl]acetamide (CAS #402-02-8),
N-[2-fluoro-5-(trifluoromethyl)phenyl]acetamide (CAS #349-27-9),
N-[4-chloro-3-(trifluoromethyl)phenyl]acetamide (CAS #348-90-3),
N-[4-bromo-3-(trifluoromethyl)phenyl]acetamide (CAS #41513-05-7),
N-[2,5-difluoro-3-(trifluoromethyl)phenyl]acetamide (CAS #1994-23-6),
N-[3-(trifluoromethyl)phenyl]acetamide (CAS #351-36-0),
N-[2-methyl-3-(trifluoromethyl)phenyl]acetamide (CAS #546434-38-2),
N-[2-amino-3-(trifluoromethyl)phenyl]acetamide (CAS #1579-89-1),
N-[3-(trifluoromethyl)phenyl]-2,2,2-trifluoroacetamide (CAS #2946-73-8),
N-[3-(trifluoromethyl)phenyl]-2,2-dichloroacetamide (CAS #2837-61-8),
N-[3-(trifluoromethyl)phenyl]-2,2,2-trichloroacetamide (CAS #1939-29-3),
N-[4-chloro-3-(trifluoromethyl)phenyl]-2,2,2-trichloroacetamide (CAS #13692-04-1),
N-[3-(trifluoromethyl)phenyl]-2-bromoacetamide (CAS #25625-57-4),
N-[3-(trifluoromethyl)phenyl]propanamide (CAS #2300-88-1),
N-[2-chloro-5-(trifluoromethyl)phenyl]propanamide (CAS #721-57-3),
N-[3-(trifluoromethyl)phenyl](2,2-dimethyl-propanamide) (CAS #1939-19-1),
N-[2-methyl-3-(trifluoromethyl)phenyl](2,2-dimethyl-propanamide) (CAS #150783-50-9),
N-[4-chloro-2-methyl-3-(trifluoromethyl)phenyl](2,2-dimethyl-propanamide) (CAS #112641-23-3),
N-[3-(trifluoromethyl)phenyl](2-chloro-propanamide) (CAS #36040-85-4),
N-[3-(trifluoromethyl)phenyl]butanamide (CAS #2339-19-7),
N-[3-(trifluoromethyl) phenyl]isobutanamide (CAS #1939-27-1),
N-[3-(Trifluoromethyl)phenyl]cyclopentanecarboxamide (CAS #13691-84-4),
N-[3-(trifluoromethyl)phenyl](2-methyl-pentanamide) (CAS #1939-26-0),
N-[3-(trifluoromethyl)phenyl](2,2-Dimethyl-pentanamide) (CAS #2300-87-0),
N-[3-(trifluoromethyl)phenyl](2-(4-Bromophenyl)-acetamide) (CAS #349420-02-6),
N-[3-(Trifluoromethyl)phenyl]-1-adamantanecarboxamide (CAS #42600-84-0),
N-[2-chloro-5-(trifluoromethyl)phenyl]octanamide (CAS #4456-59-1).

These molecules, used as an ASM, by their integration in a formulation combining at least one CEM and optionally a fluidizing agent, allow the extraction of ionic species and, in particular, of hydrophilic salts from water to the extracting organic phase. An ASM which is particularly able to be used in an extracting process according to the invention is a molecule of formula

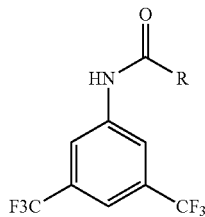

in which R=n-$C_7H_{15}$, n-$C_9H_{19}$, n-$C_{11}H_{23}$ or n-$C_{13}H_{27}$, respectively known as ASM9, ASM10, ASM11 and ASM12.

By "hydrophilic salt" is meant a salt which is soluble in water at more than 1 g/Liter at 20° C., more particularly at more than 20 g/L at 20° C., and advantageously at more than 100 g/L of water at 20° C.

Fluidizing Agent

Some of the CEMs and ASMs being solid or viscous compounds at the operating temperatures of the extracting process, the use of a fluidizing agent is thus advantageous. Given that the process according to the invention especially allows to extract relatively high concentrations of salts, a fluidizing agent able to dissolve at least 0.1 mol/L of CEM and ASM, accumulated, should be identified. Indeed, conventional solvents, such as acetone, ethyl acetate, heptane, dimethyl formamide, nitromethane, methanol, ethanol, diethyl ether or acetonitrile, for example, do not dissolve at these levels of concentration, many of known CEMs and, in particular, the macrocycles with a 16-to-32-atom cycle described above.

However, solvents or diluents, such as dichloromethane, and more particularly polar aromatic solvents turn out to be good candidates as a solubilizing agent for this application. This can be explained by the similar nature of ASMs, which are themselves aromatic compounds in general. For example, 1,3-bis(trifluoromethyl)benzene (CAS #: 402-31-3) and more preferentially benzyl benzoate (CAS #: 120-51-4) composed of two aromatic rings meet this solubilization criterion on illustrated formulations. The presence of at least one trifluoromethyl or chloride-type electron-withdrawing group on one aromatic ring or 2 aromatic rings allows to obtain particularly advantageous fluidizing compounds. Dichlorobenzene-type compounds (for example, 1,2-dichlorobenzene (CAS #: 95-50-1)) and dichlorotoluene-type compounds (for example, 2,4-dichlorotoluene (CAS #: 95-73-8)), their derivatives and their mixtures are diluents which are particularly adapted to the dilution of CEMs according to the invention. By "derivatives" is meant aromatic compounds substituted with the aforementioned trifluoromethyl group, as, for example, a solvent with mixed groups, such as 2,4-dichloro-(trifluoromethyl)benzene (CAS #: 320-60-5), but also di-aromatic compounds, such as diphenyl ether (CAS #101-84-8).

It is also possible to select an ASM such that it combines the functions as an ASM and as a diluent of the CEM and/or other ASMs.

According to one preferential aspect of the invention, the composition only comprises the ASM and CEM compounds, and optionally in association with a fluidizing compound, thus constituting a composition composed of ASM and CEM and of one fluidizing compound.

Another object of the invention relates to the use of these ASM compounds and, in particular, amide ASMs for the extraction of salts and/or ions from an aqueous medium. In particular, these compounds may be used, individually or mixed together, in a composition or in a process according to the invention as described in the present application.

ASM Concentration in the Organic Liquid Composition

According to one preferred aspect of the invention, the molar concentration of one ASM (or of a mixture of such compounds) in the composition according to the invention is at least equal to 0.1 M. Preferably, this composition is higher, and is at least equal to 1 M so as to allow an optimized extraction, in particular of hydrophilic anions. Depending on the efficiency of the anionic solvation of the selected ASM, it may also be at least equal to 2 M, advantageously at least equal to 3 M, for example at least equal to 4 M. The ASM concentration to be retained depends on the efficiency of the ASM as an anion solvation agent. An excess of ASM not improving the extraction performance has no interest. Nor is a lack of fluidity of the extracting composition due to a high ASM concentration, optimal. In certain variants of the invention, the ASM, or a mixture of ASMs, may be used pure, in its liquid form (molar concentration of 7.32 M for [(Trifluoromethyl)phenyl]methanol (CAS #: 349-75-7) or 6.41 M for 3,5-bis(trifluoromethyl) aniline (CAS #: 328-74-5). The ASM concentration which is finally retained depends on the intended application and on the relative cost between an ASM and a fluidizing agent so as to achieve the best technical/economic solution for deionizing water.

Density, Solubility and Viscosity

According to one advantageous aspect of the invention, the ASM allowing the anion solvation, in the organic liquid composition, and particularly the extracted organic liquid composition, of at least one anion, has a solubility in water, in its free or complexed form, of less than 0.1 Mol/L, preferably less than 0.01 Mol/L, preferably less than 0.0001 Mol/L and more particularly less than $1\times10^{-5}$ Mol/L.

According to another advantageous aspect of the invention, the ASM of at least one extracted anion has a density higher than 1 kg/Liter, advantageously higher than 1.1 kg/Liter, ideally higher than 1.2 kg/Liter. This design choice is closely linked to the choice of the fluidizing agent which, via a higher density, may compensate for the lack of density of the ASM.

According to yet another advantageous aspect of the invention, the liquid ASM or the ASM+fluidizing agent mixture has a viscosity at 25° C. of less than 100 mPa·s, preferably less than 50 mPa·s, for example less than 20 mPa·s.

Relative Concentration of ASM and CEM in the Organic Liquid Composition

In order to ensure a maximum extraction of the ionic species, the concentrations of ASM and CEM are selected depending on the concentration in the aqueous solution of the ionic species to be extracted. By "aqueous solution" is meant a liquid containing more than 50 mol % of water.

Thus, at iso-volume of salt water and extraction formulation, the concentration of the CEM compound is advantageously equimolar or higher than the concentration of the cation to be extracted. A concentration about twice as high generally constitutes a limit beyond which cation extraction is not substantially improved. The concentration of the CEM compound which is actually retained is mainly limited by the capacity of solubilization of the CEM in the ASM alone or in the ASM+fluidizing agent mixture and/or by the obtained global formulation viscosity and/or by the global technical/economic assessment optimum.

Surprisingly, a molar concentration of ASM much higher than that of the anion to be extracted may be required to allow an optimized extraction. Thus, at least twice, preferably three times, even four times, five times or six times, even more, the concentration of the anion to be extracted may be necessary to obtain satisfactory results, particularly when the anion is chloride anion. The concentration of the ASM which is actually retained is mainly limited by the capacity of solubilization of the ASM in the CEM+fluidizing agent mixture and/or by the obtained global formulation viscosity and/or by the global technical/economic assessment optimum.

Thus, the relative molar ratio of ASM/CEM of a composition according to the invention to extract a salt consisting of one anion and one cation is advantageously greater than or equal to 1, 2, 3, 4, 5 or 6. The choice of the relative molar ratio ASM/CEM to be retained for an industrial application depends on the relative cost of these compounds, on the technical/economic data of the project, and on the anion solvation activity of the selected ASM. Preferably, this ratio is at least equal to 4 for an alcohol ASM and between 1 and 4 for an amide ASM.

The CEM concentrations given in the examples are related to the volume of the ASM+fluidizing agent mixture and thus do not take into account the increase in volume of the global formulation caused by the dilution of a macromolecule, such as these CEMs. Thus, the actual CEM concentration is generally 10% to 25% lower, without this range being limiting.

Use of the Composition According to the Invention

The composition according to the invention may advantageously be used to extract hydrophilic ions (cations, anions) from an aqueous phase. It should be noted that this ion extraction is not compensated by the transfer of chemical, ionic or other species, from the organic phase to the aqueous phase, or conversely. This composition is particularly adapted to the extraction of ionic species in a selective way from an aqueous solution comprising several salts and/or ionic species. Thus, it is particularly adapted to the selective extraction of at least one non-alkaline cationic species from an aqueous saline solution.

Anions and Cations to be Extracted

The CEM and ASM compounds comprised in the composition according to the invention are compounds allowing the extraction and the solvation of at least two, and preferably, several ionic species. Both ionic species may especially constitute one or more hydrophilic salts. According to one object of the invention, the CEMs and ASMs are selected so as to be able to extract more than one salt, and preferably several salts, from a saline solution containing them. Preferably, these salts comprise or are chloride salts. According to another object of the invention, these ions are the components, for example, of one or more alkaline-earth salts, as well as of the salts of some metals, such as cadmium $Cd^{2+}$, lead $Pb^{2+}$ or silver $Ag^+$ salts.

By "salt" is meant an ionic compound consisting of cations and anions forming a neutral product and without net charge. These ions may be both inorganic (chloride $Cl^-$, calcium $Ca^{++}$ . . . ), and organic (acetate $CH_3$—$COO^-$, ammonium $R_3NH^+$ . . . ) and monoatomic (fluoride $F^-$, magnesium $Mg^{2+}$ . . . ) as well as polyatomic (nitrates $NO_3^-$, hydrogen carbonate $HCO_3^-$, sulfate $SO_4^{2-}$ . . . ).

Particularly preferably, the compositions comprising a mixture of CEM and ASM, with or without a fluidizing agent, according to the invention may extract from a solution comprising:

at least one alkaline metal cationic species,
at least one non-alkaline cationic species, in particular a divalent one, and
at least one complementary anionic species,
an amount of said non-alkaline cationic species much larger than that of the alkaline metal cationic species. Alternately or additionally, the amount of alkaline metal cationic species which is extracted by this composition is very low.

By "much larger relative amount" and "very low extraction" is meant that the extraction rate (in molar percentage) of the one or more cations to be extracted is at least twice as high as the extraction rate of the alkaline cations of the treated aqueous solution. This ratio may advantageously be at least 5, or even more than 10. Some compositions according to the invention allow to achieve ratios equal to 13 at initial iso-concentration of cations to be extracted and cations not to be extracted, or even to extract the whole of the ions to be extracted (for example Ca) while hardly extracting alkaline cations (for example Na), especially when a large majority of the alkaline cations are present.

The one or more cations to be extracted are, preferably, selected from the alkaline-earth metal group, and more particularly, from calcium, strontium and/or barium. The extraction of such divalent cations and, in particular, of calcium most commonly present in water, allows to avoid scaling phenomena by combining the same with specific anions.

An alkaline metal is a chemical element from the first column (group 1, except for hydrogen) of the periodic table of the elements. Lithium, sodium, potassium, rubidium, cesium and francium are alkaline metals. They have a single charge +.

The extraction of alkaline-earth cation salts is carried out by complexing the CEM for this cation and by a "following" of anions from the aqueous phase to the organic phase in order to ensure a neutralization of the charges +/−.

The "following" anions, solvated by the ASMs, are mainly the least hydrophilic anions, that is to say the anions which have the highest free energy of hydration. Thus, the preferential order of extraction of anions running from the aqueous phase to the organic formulations according to the invention are: $BF_4^-$, $I^-$, $Br^-$, $NO_3^-$, $Cl^-$, $HCO_3^-$, $CH_3COO^-$, $F^-$, $SO_4^{2-}$, $CO_3^{2-}$. Thus, in the case of alkaline-earth salts, iodide, bromide, nitrate and/or chloride salts will be extracted as a priority. These salts being very soluble in water, even at a high water temperature ($CaCl_2$ is soluble in water at more than 40% by weight), they can be rendered as a concentrated brine during the solvent thermal regeneration step. The extracted alkaline-earth or metallic salts according to the invention thus allow to separate the cations from the anions responsible for scale deposit and potentially constituting scaling salts to drive them into two distinct aqueous effluents. The partially deionized waters according to the invention are thus composed of the most hydrophilic anions, that is to say fluorides, sulfates and carbonates, and the non-extracted alkaline cations. Thus, this water has lost all capacity for scaling. It is softened water. By the way, this is also the case for the water resulting from the thermal regeneration of the process according to the invention which is mainly composed of alkaline-earth and metallic chloride salts. Thus, the purpose of the invention is to be able to remove the barrier of scale deposit from many industrial applications by avoiding the combined presence, in a same effluent, of cations and anions which, when they are combined, are not or poorly soluble in water. Thus, the salts to be separated are mainly carbonate salts ($MgCO_3$, $CaCO_3$, $SrCO_3$, $BaCO_3$, $CdCO_3$, $CoCO_3$, $MnCO_3$, $PbCO_3$, $NiCO_3$, $FeCO_3$, $ZnCO_3$ . . . ), sulfate salts ($CaSO_4$, $SrSO_4$, $BaSO_4$, $PbSO_4$ . . . ) and fluoride salts ($MgF_2$, $CaF_2$, $SrF_2$, $BaF_2$, $CdF_2$, $FeF_2$, $PbF_2$ . . . ). The control of the precipitation of metallic hydroxide salts ($Mg(OH)_2$, $Ca(OH)_2$, $Cd(OH)_2$, $Co(OH)_2$, $Fe(OH)_2$, $Ni(OH)_2$, $Zn(OH)_2$ . . . ) is managed by adjusting the pH of water or by releasing the extracted divalent cations to a water having a neutral pH, or even a lightly acid pH.

The cations which are preferably extracted according to the invention are $Ca^{2+}$, $Sr^{2+}$, $Ba^{2+}$, $Pb^{2+}$, $Cd^{2+}$ and silver $Ag^+$. This list is not exhaustive as far as transition metals are concerned.

Likewise, the compositions according to the invention may be used in methods according to the invention for extracting $Ca^{++}$, $Sr^{++}$ and/or $Ba^{++}$ in an organic phase.

For the anions which are more hydrophobic, such as perchlorates $ClO_4^-$, permanganates $MnO_4^-$, picrates, lower concentrations of ASM are sufficient to perform their transfer to the organic phase in combination with at least one cation extracted by one CEM.

The composition according to the invention is thus particularly able to be used in an extracting process as described in the present application and, in particular, in a process for deionizing water through liquid-liquid extraction with thermal regeneration.

According to one preferred embodiment, the composition does not comprise a CEM allowing the extraction of sodium chloride, that is to say whose complexing constant of sodium in methanol at 25° C., Log K($Na^+$), is greater than 3.

According to one particular aspect of the invention, magnesium chloride salts are not or poorly extracted due to the implementation of CEM whose complexing constant of magnesium in methanol at 25° C., Log K($Mg^{2+}$), is lower than 3.

Liquid-Liquid Extraction Process

The invention also relates to a liquid-liquid extraction process of a non-alkaline cationic species from a saline liquid aqueous solution, said saline liquid aqueous solution comprising at least one non-alkaline cationic species, one cationic species of an alkaline metal, and one complementary anionic species, said process comprising the following steps:
a) mixing in a first reactor, at a first temperature, of a liquid hydrophobic organic phase and of said saline liquid aqueous solution, in order to subsequently obtain a treated liquid aqueous solution and a hydrophobic liquid organic phase charged with said non-alkaline cationic species and said complementary anionic species,
said liquid hydrophobic organic phase comprising an extracting molecule of said non-alkaline cationic species, a solvating molecule of said complementary anionic species and, optionally, a fluidizing agent;
b) separating, on one hand, said treated liquid aqueous solution and, on the other hand, said liquid organic phase charged with said non-alkaline cationic species and said complementary anionic species;
said process being characterized in that said extracting molecule of the non-alkaline cationic species is a CEM as described above and in that said solvating molecule of the complementary anionic species is advantageously an ASM as described above, in particular an amide-type ASM.

Preferably, a subsequent step c) is carried out, comprising: mixing, at a second temperature, which is preferably higher than the first one, in the liquid phase, in a second reactor, of said liquid organic phase, charged with said non-alkaline cationic species and said complementary anionic species, with a regeneration liquid aqueous solution, in order to subsequently obtain a regenerated liquid organic phase and a regeneration liquid aqueous solution charged with said non-alkaline cationic species and said complementary anionic species, the difference between said first and second temperatures varying from 30° C. to 150° C., preferentially varying from 50° C. to 100° C.

The term "non-alkaline cation" or "non-alkaline cationic species" is intended to exclude cations originating from alkaline metals. Preferably, non-alkaline cationic species are divalent cations, such as alkaline-earth cations. The process according to the invention is particularly adapted to the extraction of one of the following cations: calcium, strontium and barium. It can also apply to monovalent metallic cations, such as silver $Ag^+$, or to divalent metallic cations, such as lead $Pb^{2+}$ and cadmium $Cd^{2+}$. According to one preferred aspect of the invention, the cationic species of an alkaline metal is sodium ion $Na^+$. Advantageously, this one is poorly or not extracted from the saline solution.

Non-alkaline cation salts are composed of the aforementioned cations and of a complementary anionic species, or anion. The phrase "complementary anionic" indicates that the charge of the one or more anionic species corresponds to that of the cationic species and allows to neutralize it, thereby constituting a neutral salt.

CEMs and ASMs, as well as the possible fluidizing agent, are as described above.

Alternately, the ASM may also be a hydrophobic compound and, preferably, a protic hydrophobic compound, the pKa of which in water at 25° C. is at least 9, preferably at least 10.5 and is preferentially lower than the pKa of water at 25° C., or at least lower than 15 at 25° C.

The CEM may also be an organic and hydrophobic compound having a complexing constant of the non-alkaline cationic species to be extracted the Log K value of which, in methanol at 25° C., is greater than 3 and less than 11, preferably greater than 5 and less than 9. Furthermore, in the case of selective CEMs for the extraction of the non-alkaline cationic species, it may have a Log K value, in methanol at 25° C., of less than 5, preferably less than 3 for alkaline cations, and in particular for sodium.

The pKa (or acidity constant) is defined by pKa=−$\log_{10}$Ka, where Ka is the acid dissociation constant which is measured in a standard way for such pKas. The standard measurement method recommended for high, basic pKas is, preferably, the one described by Popov et al, *IUPAC—Guidelines for NMR measurements for determination of high and low pKa Pure Appl. Chem.*, Vol. 78, No 3, pp 663_675, 2006.

K is the complexing constant of a CEM and a non-alkaline cation in methanol, at 25° C., which is measured according to the standard method of isothermal calorimetric titration.

According to one particular aspect of the invention, the non-alkaline cationic species is selectively extracted with respect to a cationic species of an alkaline metal. Such a selection can achieve the levels described above.

Unlike many already known ion extraction processes, the process according to the invention is not based on a change in pH to allow either the absorption or the release of the captured ions, in particular through an acid-base mobility of hydrogen ion $H^+$. Thus, in one preferential aspect of the invention, the process does not comprise a step in which the pH of the regeneration liquid aqueous solution is significantly changed, that is to say beyond a change in pH by +/−2, for example by ±1 with respect to the water to be treated. According to a preferential aspect of the invention, the process does not comprise, during the regeneration step of the ion extracting solvent, the addition, the use or the presence of compounds aiming to modify pH of the regeneration liquid aqueous solution, such as acids or bases, in particular inorganic acids such as sulfuric, hydrochloric or nitric acids or bases such as soda or potash.

Furthermore, this process advantageously allow to extract, from the water to be treated, at least one alkaline-earth cationic species as well as anionic species, such as Br⁻ or Cl⁻ ions. It should be noted that such anionic species are hydrophilic and particularly difficult to extract from an aqueous medium. One particularly advantageous aspect of the process according to the invention is that it allows the extraction, from an aqueous phase, of cations, and especially of $Ca^{++}$-type cations, and of anions, and particularly of Cl⁻-type anions simultaneously and for extracted salt concentrations which may exceed 0.1 Mol/L.

Step a)

The mixing step a) of the saline liquid aqueous solution and the hydrophobic organic phase can be carried out by stirring the two liquid phases, for example by mechanical or orbital stirring, by producing highly turbulent flows and/or by vertical interpenetration (static or stirred gravitational column) when these two phases are of different densities. The technological choice associated with the implementation of the process being the subject of the invention depends on the transfer kinetics of salts associated with the process and on the considered operating temperatures.

It may be necessary to repeat these mixing steps a) to achieve the intended salt extraction performance. In this case, the flows of the saline solution to be treated and of the organic phase can run at counterflow in the mixing reactors for a maximum deionization performance.

It is also preferred that the mixing step a) does not happen in conditions resulting in a microemulsion or in a stable emulsion and that, in any case, the selected ASM does not have a surfactant-type activity.

Step b)

The step b) of separating the aqueous and organic phases may advantageously be a simple gravitational decantation of the organic phase and of the liquid aqueous phase. This decantation can take place in the reactor where the mixture is made. Alternately, the separation may be achieved by the application of an external means, for example centrifugation, optionally in a centrifuge unit, distinct from the reactor where the aqueous and organic phases are mixed. The decanting time of both phases is an important parameter of the process because of the immobilized organic phase volume. Likewise, a density differential between non-miscible liquid phases greater than 0.1 kg/L, or even greater than 0.2 kg/L is preferred. Thus, the organic phase is advantageously selected to have a higher density than the density of the water to be treated, of the treated water and of the produced regeneration saline water. Alternately, the organic phase may be selected to have a lower density than the density of the water to be treated and of the treated water. In these two cases, the density differential should be sufficient to allow an effective decantation of the two phases when this type of mixture is used. In these two cases, if a density differential between the non-miscible liquid phases implemented in the process is lower than 0.1 kg/L, the implementation of a centrifugation-type decanting system which is able to separate liquid phases the difference of density of which is only 0.05 kg/L may be considered.

Step c)

Once the phases are separated, the liquid organic phase charged with ionic species is advantageously directed to one or a series of second reactors where, after having been reheated, it is contacted with liquid water, or regeneration water, at a second temperature which is higher than the first one. This regeneration with "hot" water of the organic phase allows a back-extraction of the salts absorbed in step a) which is all the more effective since the regeneration water is hot. Thus, this allows to lower the volume of regeneration water and/or to increase the productivity of the liquid organic phase and/or to reduce the number of implemented desorption reactors and/or to produce a regeneration water charged with back-extracted salts at a high concentration. Except for temperature, this mixing step c) allowing the back-extraction of salts can be carried out under similar operating conditions to those described for the mixing step a) which allows the extraction of salts. However, some of the conditions, such as, for example, pressure, may vary to avoid, for example, boiling of the water or of the fluidizing agent. Furthermore, carrying out this step for regenerating the extracting composition at a higher temperature impacts on the hydrodynamics of the flows with a reduced viscosity of the organic phase, thereby promoting the decantation of the phases as well as the kinetics of salt transfer between phases, which may cause another technology to be selected instead of that which is implemented in step a). The water or the regeneration liquid aqueous solution will be selected so as to be compatible with the back-extracted salts, in particular so as to avoid any problem of scaling, in particular of the heat exchangers for cooling the hot water resulting from this step.

Temperature

According to one advantageous aspect of the invention, step a) is carried out at room temperature. It is also advantageous for the saline liquid solution not to be subjected to a preliminary heating or cooling step. Alternately, a preliminary heating or cooling step may take place. In this case, it is preferable that the saline liquid solution is not heated or cooled by more than 5° C., advantageously by more than 2° C., with respect to the saline liquid solution to be treated.

According to another advantageous aspect of the invention, the first temperature is at a temperature lower than 50° C. and greater than 0° C. This temperature may advantageously be selected in ranges from 10° C. to 40° C., preferably from 15° C. to 30° C., and particularly from 19 to 26° C. (for example, 25° C.).

By "temperature range from 10° C. to 50° C." is meant temperatures of 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C. or 50° C.

According to another particularly advantageous aspect of the invention, the second temperature is a temperature higher than 60° C., preferably higher than 85° C. This temperature may be selected in ranges from 60° C. to 150° C., preferably from 85° C. to 125° C., and particularly from 90° C. to 120° C. (for example, 95° C.).

By "temperature range from 60° C. to 150° C." is meant temperatures of 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., 90° C., 91° C., 92° C., 93° C., 94° C., 95° C., 96° C., 97° C., 98° C., 99° C., 100° C., 101° C., 102° C., 103° C., 104° C., 105° C., 106° C., 107° C., 108° C., 109° C., 110° C., 111°

C., 112° C., 113° C., 114° C., 115° C., 116° C., 117° C., 118° C., 119° C., 120° C., 122° C., 124° C., 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C., 146° C., 147° C., 148° C., 149° C. or 150° C.

The first and second temperatures are necessarily selected so that the mixture remains in the liquid state at the operating pressure and so that the technical/economic performance of the invention is maximum. It is particularly advantageous that the difference between these temperatures, $\Delta T$, is selected within a range from 30° C. to 150° C., preferably from 50° C. to 100° C. By "$\Delta T$ ranging from 50° C. to 100° C." is meant a $\Delta T$ of 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., 90° C., 91° C., 92° C., 93° C., 94° C., 95° C., 96° C., 97° C., 98° C., 99° C. or 100° C. Likewise, if the first temperature is 20° C., the second temperature will be higher than 50° C., advantageously higher than 70° C., for example 80° C.

Thus, the process of the invention may comprise a first step a) allowing the transfer of specific ionic species, which are preferably complementary, from the saline liquid aqueous solution to be treated to the organic phase, at room temperature, followed by a step c) allowing the regeneration of the organic phase charged with ionic species, which are preferably complementary, and which takes place at a temperature which is higher than room temperature but not too high so as to arise from geothermal, solar or other renewable energies (for example, lower than 150° C.).

According to one preferred aspect of the process, it comprises the subsequent steps of:
c) separating said regenerated liquid organic phase and water, or the regeneration liquid aqueous solution charged with said ionic species which are preferably complementary,
d) bring into indirect thermal contact, for example, through a heat exchanger, said liquid organic phase charged with ionic species with said regenerated liquid organic phase.

According to one particular aspect of the invention, it is advantageous for the process to comprise heating and/or cooling steps of:
the organic phase charged with ionic species,
the organic phase, in particular regenerated, not charged with ionic species,
the regeneration water or aqueous solution, and
the regeneration water or aqueous solution charged with discharged ionic species;
which precede the introduction of these various phases or waters into the first and second reactors.

Such heating steps may be carried out in whole or in part by heat exchanges between at least two of the aforementioned various phases (that is to say between the charged organic phases and in particular the regenerated organic phases, non charged with ionic species, or between the aqueous phases that are water, and a regeneration aqueous solution, or between water and a regeneration aqueous solution charged with discharged ionic species).

In particular, the process according to the invention comprises a step of heating the regeneration water or aqueous solution carried out before step c), and/or comprises a heating step of the organic phase charged with ionic species carried out before step c).

The hot regeneration of the extracting composition allows, for example, a 2-fold reduction of the number of necessary regeneration steps 2 before its recirculating within the process. This advantage seems to be even more significant when a resin with a high CEM content, and thus a high salt content, is implemented.

Increasing the regeneration temperature allows to reduce the number of successive steps for contacting distilled water or regeneration water while allowing a larger back extraction of salts each time.

Pressure

The mixing steps a) and/or c) are advantageously carried out at atmospheric pressure of about 1 atm at sea level or without the application of pressure means other than the weight of the liquids present in the reactor.

If a pressure is applied, this one may be positive or negative. Such a pressure may range from 0.8 atm to 80 atmospheres, preferably from 1 to 10 atm.

Use of Treated Water

Advantageously, the regeneration liquid water or aqueous solution used in step c) arises from the treated saline aqueous solution obtained at the end of step a) after a complementary treatment allowing to avoid any risk of scaling during steps c), d) or e). Alternately, it may arise from an external source.

Composition

The organic phase comprises, or mainly consists of, or consists of, the composition according to the invention which is described in the present application. This composition is particularly effective for implementing said process. Compositions particularly suitable for implementing the process according to the invention comprise compositions associating an amide ASM associated with at least one of the CEM-type compounds as described above and optionally with a fluidizing agent.

In the description of the invention, this composition can also be called "solvent" or "liquid resin".

Device

The invention also relates to a device for extracting at least one non-alkaline cationic species and at least one complementary anion, present in a liquid aqueous saline solution, comprising:
a first reactor comprising a liquid hydrophobic organic phase or composition according to the invention as described in the present application.

This device may advantageously comprise:
a first reactor comprising said hydrophobic and liquid organic composition and optionally the saline aqueous solution, in the liquid state, for the subsequent production of a treated aqueous saline solution and of a hydrophobic liquid organic phase and charged with said non-alkaline cationic species and said complementary anionic species, said first reactor further comprising first mixing means and first means for separating, on the one hand, said treated liquid aqueous saline solution and, on the other hand, said charged liquid organic phase,
a second reactor comprising a liquid hydrophobic organic phase charged with at least said non-alkaline cationic species and at least one complementary anion neutralizing its charge, and a regeneration water or aqueous solution to subsequently obtain a regeneration liquid aqueous solution charged with said ionic species and a regenerated organic phase, said second reactor comprising second mixing means and second means for separating, on the one hand, said regeneration saline solution charged with ionic species and, on the other hand, said regenerated organic phase;

optionally means for controlling the temperature in said second reactor;

connecting means allowing the transfer between the first and the second reactor of:

said regeneration liquid aqueous solution which can be extracted from said first reactor said charged liquid hydrophobic organic phase extracted from said first reactor said regenerated liquid hydrophobic organic phase extracted from said second reactor;

said regeneration liquid water charged with salts coming from said second reactor; and, a heat exchanger bringing together, on the one hand, said charged liquid hydrophobic organic phase extracted from said first reactor and, on the other hand, said regenerated liquid hydrophobic organic phase extracted from said second reactor; and optionally, a heat exchanger bringing together, on the one hand, said regeneration liquid water or aqueous solution and, on the other hand, said regeneration liquid water charged with back-extracted complementary ionic species.

According to one particular aspect of the invention, the reactors, and more particularly those parts of these reactors which are not movable, are not made of stainless steel.

According to another particular aspect of the invention, the first reactor and/or the first reactors do not comprise heating (heaters) or cooling (cooler) means.

According to yet another particular aspect of the invention, the organic phase present in the device comprises, or mainly consists of, or consists of, the composition according to the invention described in the present application.

The device according to the invention may advantageously be mounted in series to enable successive steps of treating the water to be treated in order to reduce the concentration in ionic species of the water until pure water and/or water purified from the ionic species to be extracted is obtained. Such a device is also covered by the present invention.

Likewise, the device according to the invention may advantageously be mounted in series to enable successive steps of regenerating the liquid hydrophobic organic phase charged with salts in order to reduce the concentration in ionic species of the resin until a resin sufficiently purified from the extracted ionic species is obtained. Such a device is also covered by the present invention.

The invention also relates to a liquid-liquid extraction process of a salt or a mixture of salts composed of at least one hydrophilic anion, such as chloride (cf example 1 and 2). The extracted cations may have a ionic radius ranging from 55 pm to 180 pm, advantageously from 70 pm to 167 pm. Such cations are especially lithium, sodium, potassium, rubidium and cesium cations, which are monovalent cations, or calcium, strontium or barium cations, which are divalent cations, or even transition metal cations.

This process comprises the following steps:

i) mixing in a first reactor, at a first temperature, a liquid hydrophobic organic phase and said saline liquid aqueous solution, in order to subsequently obtain a treated liquid aqueous solution and a liquid hydrophobic organic phase charged with said cationic species and said complementary anionic species, said liquid hydrophobic organic phase comprising an extracting molecule of said cationic species as described above, a solvating molecule of said complementary anionic species and, optionally, a fluidizing agent;

ii) separating, on one hand, the treated liquid aqueous solution and, on the other hand, said liquid hydrophobic organic phase charged with said cationic species and said complementary anionic species;

said process being characterized in that said extracting molecule of the cationic species is a CEM as described above for the macrocycles having from 16 to 22 atoms, especially carbon atoms, and in that said solvating molecule of the complementary anionic species is advantageously an ASM as described above.

Advantageously, the process comprises a subsequent step of regenerating the hydrophobic organic liquid phase which can be of the same type as the one described above. Advantageously, the regeneration temperature ranges from 60° C. to 150° C., preferentially from 90° C. to 120° C.

The compounds and other conditions of the process may advantageously be those described with reference to the extraction process of a non-alkaline cationic species. Likewise, the invention relates to a device allowing to implement the process which is substantially equivalent or identical to the device described above.

DESCRIPTION OF THE FIGURES

The invention will be better understood upon reading the accompanying figures, which are provided by way of examples and are not limiting in nature, in which:

FIG. 5 is a table showing the extraction rates in molar %, at room temperature, of 7 salts, LiCl, NaCl, KCl, $MgCl_2$, $CaCl_2$, $SrCl_2$ and $BaCl_2$ individually extracted from a salt water the initial concentration of which was 0.1 Mol/L by using a composition containing 0.1 Mol/L of CEM1 to CEM8 and 3.5 Mol/L of ASM2 for CEM1 and CEM2, or 1 Mol/L of ASM9 for CEM3 to CEM8, the whole dissolved in dichloromethane for CEM1 and CEM2 or in 1,2-dichlorobenzene for CEM3 to CEM8 according to the invention, expressed according to the cation ionic radius, as described in part in examples 1 and 3.

EXAMPLES

Figure 1:
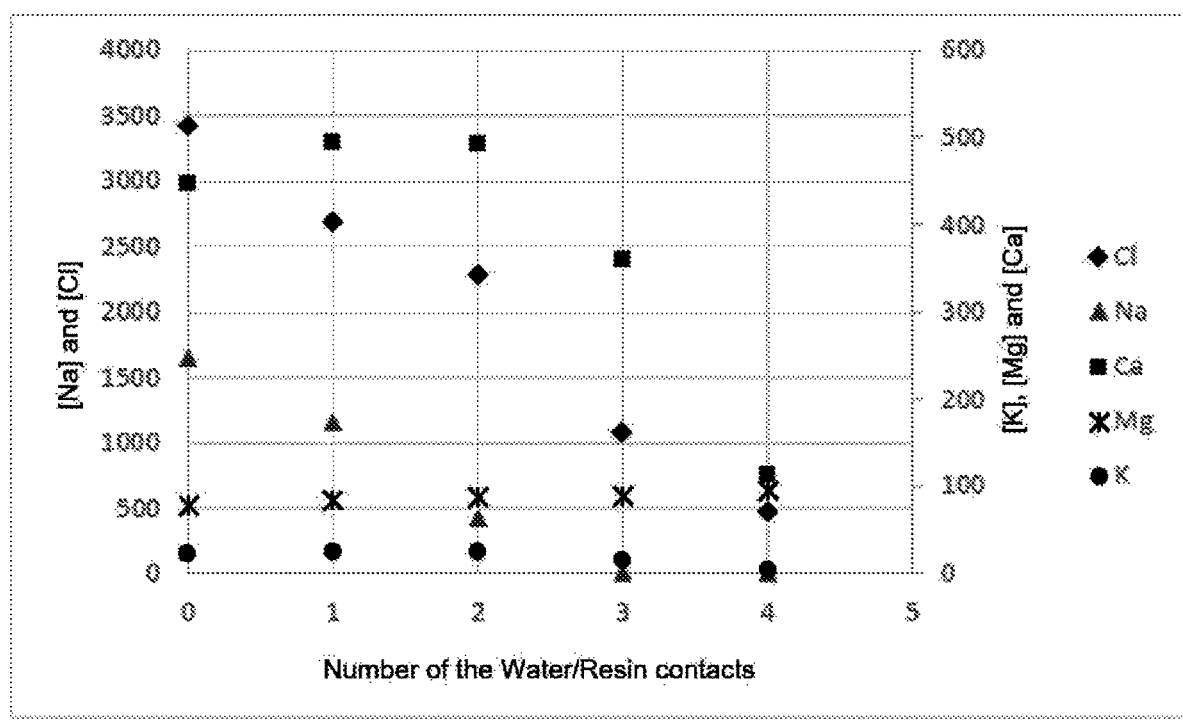
FIG. 1 is a graph showing the evolution of the concentration in mMol/L of the five ions $Na^+$, $K^+$, $Mg^{2+}$, $Ca^{2+}$ and $Cl^-$ in a salt water which was initially at 180 g/L after 4 contacts in series with a composition which contains 0.4 Mol/L of CEM1 and 1.2 Mol/L of ASM9, the whole dissolved in 1,2-dichlorobenzene according to the invention, wherein the extraction equilibrium is expected to be achieved at each step before carrying out the next one, as described in example 2.

Description of the CEMs Used in the Implementation of the Invention

Different ion extracting compositions according to the invention are illustrated. The 12 CEMs used in these compositions are as follows:

| Name | Nomenclature | Structural formula |
|---|---|---|
| CEM 1 | 4-tert-butyl-Calix[4]arene tetrakis(N,N-diethylacetamide), CAS #114155-16-7, $C_{68}H_{100}N_4O_8$, MW = 1101.5 g/mol, MP = 223-226° C., Log K(Li$^+$, MeOH, 25° C.) = 4.0 Log K(Na$^+$, MeOH, 25° C.) = 7.9 Log K(K$^+$, MeOH, 25° C.) = 5.8 Log K(Rb$^+$, MeOH, 25° C.) = 3.8 Log K(Cs$^+$, MeOH, 25° C.) = 2.5 Log K(Mg$^{++}$, MeOH, 25° C.) < 1.2 Log K(Ca$^{++}$, MeOH, 25° C.) > 9.0 Log K(Sr$^{++}$, MeOH, 25° C.) > 9.0 Log K(Ba$^{++}$, MeOH, 25° C.) = 7.2 | |
| CEM 2 | 4-tert-butyl-Calix[6]arene hexakis(N,N-diethylacetamide), CAS #111786-95-9, $C_{102}H_{150}N_6O_{12}$, MW = 1650 g/mol, Log K(Li$^+$, MeOH, 25° C.) = 2.6 Log K(Na$^+$, MeOH, 25° C.) = 2.8 Log K(K$^+$, MeOH, 25° C.) = 3.3 Log K(Rb$^+$, MeOH, 25° C.) = 2.6 Log K(Cs$^+$, MeOH, 25° C.) = 2.8 Log K(Mg$^{++}$, MeOH, 25° C.) = 1.3* Log K(Ca$^{++}$, MeOH, 25° C.) = 8.2* Log K(Sr$^{++}$, MeOH, 25° C.) = 8.1* Log K(Ba$^{++}$, MeOH, 25° C.) = 8.3* | |

*Calculated

| | | |
|---|---|---|
| CEM 3 | 4-tert-butyl-Calix[4]arene tetrakis(N-piperidinylacetamide), CAS #353236-41-6 $C_{72}H_{100}N_4O_8$, MW = 1148.6 g/mol, MP = 272-276° C. | |
| CEM 4 | 4-tert-butyl-Calix[4]arene tetrakis(N-pyrrolidinylacetamide), CAS #133801-01-1 $C_{68}H_{94}N_4O_8$, MW = 1094 g/mol, Log K(Li$^+$, MeOH, 25° C.) = 3.0 Log K(Na$^+$, MeOH, 25° C.) = 7.2 Log K(K$^+$, MeOH, 25° C.) = 5.4 Log K(Rb$^+$, MeOH, 25° C.) = 3.0 Log K(Cs$^+$, MeOH, 25° C.) = 1.0 Log K(Mg$^{++}$, MeOH, 25° C.) = 1.2 Log K(Ca$^{++}$, MeOH, 25° C.) = 7.8 Log K(Sr$^{++}$, MeOH, 25° C.) = 8.1 Log K(Ba$^{++}$, MeOH, 25° C.) = 6.8 | |

-continued

| Name | Nomenclature | Structural formula |
|---|---|---|
| CEM 5 | 4-tert-butyl-Calix[4]arene tetrakis(N,N-di-n-propylacetamide), CAS #162714-60-5 $C_{76}H_{116}N_4O_8$, MW = 1212.46 g/mol, MP = 191-194° C. | |
| CEM 6 | 4-tert-butyl-Calix[4]arene tetrakis(N,N-ethyl-n-propylacetamide), $C_{72}H_{108}N_4O_8$, MW = 1156 g/mol, | |
| CEM 7 | 4-tert-butyl-Calix[4]arene tetrakis(N,N-di-iso-butylacetamide), $C_{84}H_{132}N_4O_8$, MW = 1324.46 g/mol, MP = 164-167° C. | |
| CEM 8 | 4-tert-butyl-Calix[4]arene tetrakis(N,N-di-iso-propylacetamide), $C_{76}H_{116}N_4O_8$, MW = 1212 g/mol, | |

| Name | Nomenclature | Structural formula |
|---|---|---|
| CEM 9 | 4-tert-butyl-Calix[8]arene octakis(N,N-diethylacetamide), CAS #315191-66-1, $C_{136}H_{200}N_8O_{16}$, MW = 2100 g/mol, Log K(Li$^+$, MeOH, 25° C.) = 2.1* Log K(Na$^+$, MeOH, 25° C.) = 2.2* Log K(K$^+$, MeOH, 25° C.) = 2.2* Log K(Rb$^+$, MeOH, 25° C.) = 1.9* Log K(Cs$^+$, MeOH, 25° C.) = 2.0* Log K(Mg$^{++}$, MeOH, 25° C.) = 1.3* Log K(Ca$^{++}$, MeOH, 25° C.) = 7.2 Log K(Sr$^{++}$, MeOH, 25° C.) = 7.2* Log K(Ba$^{++}$, MeOH, 25° C.) = 8.6* | |

*Calculated

| | | |
|---|---|---|
| CEM 10 | 4-tert-Butylcalix[4]arene-tetraacetic acid tetraethyl ester, CAS #97600-5-8, $C_{60}H_{80}O_{12}$, MW = 993.27 g/mol, Log K(Li$^+$, MeOH, 25° C.) = 2.6 Log K(Na$^+$, MeOH, 25° C.) = 5.0 Log K(K$^+$, MeOH, 25° C.) = 2.4 Log K(Rb$^+$, MeOH, 25° C.) = 3.1 Log K(Cs$^+$, MeOH, 25° C.) = 2.7 | |
| CEM 11 | 4-tert-Butylcalix[5]arene-pentaacetic acid pentaethyl ester, CAS #152495-34-6, $C_{75}H_{100}O_{15}$, MW = 993.27 g/mol, Log K(Li$^+$, MeOH, 25° C.) = 1.0 Log K(Na$^+$, MeOH, 25° C.) = 4.4 Log K(K$^+$, MeOH, 25° C.) = 5.3 Log K(Rb$^+$, MeOH, 25° C.) = 5.6 Log K(Cs$^+$, MeOH, 25° C.) = 5.5 | |
| CEM 12 | 4-tert-Butylcalix[6]arene-hexaacetic acid hexaethyl ester, CAS #92003-62-8, $C_{90}H_{120}O_{18}$, MW = 1489.93 g/mol, | |

The whole of these CEMs are solids which are completely insoluble in water.

Generic Description of the Illustrated Embodiments
Extracting Composition

The extracting composition is obtained by solubilizing an amount of CEM and ASM in the selected fluidizing agent, dichloromethane $CH_2Cl_2$, dichlorobenzene or dichlorotoluene or any other fluidizing agent able to well solubilize the mixture CEM/ASM in order to obtain the searched final concentrations after solubilizing CEMs and ASMs in a minimum of 3 milliliters of fluidizing agent. If the selected fluidizing agent is also an ASM compound, so the selected ASM volume is at least 3 milliliters. The given concentrations of ASM2 and ASM9 are related to the added fluidizing agent volume and the concentrations of CEM are related to the added fluidizing agent+ASM volume. The extracting organic composition is then lightly heated so as to promote the solubilization of the organic compounds by means of a heat gun (temperature around 50 to 60° C.) for a few seconds (10 to 30 seconds) until a clear solution is obtained. The composition is thus left for 24 hours at room temperature so as to make sure that the obtained formulation is stable.

These sealed formulations are then orbitally stirred at 500 revolutions/minute for two hours after adding an equivalent volume of water which was distilled twice so as to allow a water saturation of the whole formulation and a pH control at the inlet and at the outlet (pH close to 7, or at least maintained after contact with the saturation water).

The extracting composition is thus left for decantation. All the compositions are stable and are decanted quickly (a few minutes at most) in two distinct phases.

Salt Water—Brine Especially Containing Salts to be Extracted

An aqueous solution of the one or more considered chloride salts (NaCl or others) is prepared from a water which was distilled twice. The chloride salts which are used are as follows: LiCl, NaCl, KCl, $MgCl_2$, $CaCl_2$), $SrCl_2$ et $BaCl_2$.

Extraction/Back-Extraction 3 mL of the prepared extracting organic composition are then taken from the lower phase of the decanted diphasic mixture and transferred to a vial containing 3 mL of the water containing the one or more considered chloride salts (NaCl or others), then the vial is sealed and orbitally stirred (at 500 revolutions per minute) for 2 hours at room temperature (RT), that is to say between 20 and 25° C.

Concerning the extraction or back extraction assays at a higher temperature, in particular at 60° C. or at 80° C., a magnetic stirring (at 500 revolutions per minute), for 2 hours, is carried out with an indirect thermostatically-controlled heating in a metal mold on a hotplate.

A verification is made to make sure that droplets in the range of 1-2 mm are really present during these stirrings in order to be sure that an equilibrium in the distribution of the considered chloride salt (NaCl or other) is achieved between both liquid phases at the end of stirring. The aspect of the organic and aqueous phases is clear and colorless or slightly turbid.

Once the 2-hour stirring is carried out, the stirring is stopped and the whole is left for decantation for about 10 minutes, at least until both phases are completely separated, at the temperature of the assay. Then, the upper aqueous phase is taken then stirred and diluted in order to analyze its salinity by a ion chromatography (a Metrohm™ device including a cation analyzing column and an anion analyzing column suitable for the ions and for the concentration of the salts which are searched for). Likewise, the chloride salt (NaCl or other) initial aqueous solution is also analyzed by this ion chromatography to determine its cation and chloride molar relative concentration before the extraction. All the extractions and analyses were duplicated.

Example 1: Extractions at Room Temperature of Mono-Salt Saline Solutions with CEM1

In this example, the CEM used is 4-tert-butyl-Calix[4]arene tetrakis(N,N-diethylacetamide) (CEM1 of CAS #: 114155-16-7).

It was synthesized from 4-tert-Butylcalix[4]arene of molecular formula $C_{44}H_{56}O_4$ and of CAS #60705-62-6, bought at TCI Chemicals, according to the synthesis procedure described in the publication «Selective alkali and alkaline earth cation complexation by calixarene amides, New J. Chem, 1991, 15, 33-37 ».

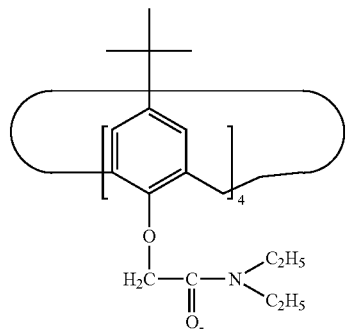

The ASM used is ASM2 of CAS #32707-89-4, $C_9H_6F_6O$, MW=244.13 g/mol, a white solid which is available for purchase from several distributors. Its characteristics are as follows:

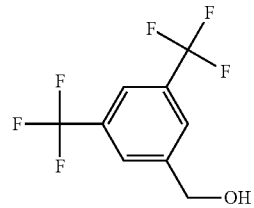 [SMILES: OCc1cc(C(F)(F)F)cc(C(F)(F)F)c1]

| Parameters | Values | Units |
|---|---|---|
| Density | (1.433) | kg/L |
| Viscosity | — | mPa · s |
| BP | 255 | ° C. |
| MP | 55 | ° C. |
| FP | 97 | ° C. |
| Log P | 3.0 (estimated) | — |
| Solubility | 2.29 | mMol/L |
| pKa | 14.7 +/− 1 | — |

The considered extracting composition comprises 0.1 mol/L of CEM1 and 3.52 mol/L of ASM2 in dichloromethane $CH_2Cl_2$, which was obtained as described above. The initial concentration of the considered salt in water, whether it is LiCl, NaCl, KCl, $MgCl_2$, $CaCl_2$), $SrCl_2$ or $BaCl_2$, is 0.1 mol/L.

After carrying out these 7 specific extractions (duplicated) of salts, the amounts of extracted cations in relative molar percentage before and after extraction at room temperature and at water/extracting formulation iso-volume are indicated in table I:

TABLE I

| CEM1 | 0.1M | Extraction rate at room temperature (RT) (Org./Water = 1) | | | | | | |
|---|---|---|---|---|---|---|---|---|
| ASM2 | 3.52M | LiCl | NaCl | KCl | $MgCl_2$ | $CaCl_2$ | $SrCl_2$ | $BaCl_2$ |
| Fluidizing agent | $CH_2Cl_2$ | 73.7% | 85.8% | 75.8% | 5.4% | 59.4% | 64.0% | 46.1% |

The extraction of cations from a brine consisting of only one alkaline or alkaline-earth chloride thus varies from 5.4% to 85.8% depending on the cation. In these mono-salt solutions, and for this CEM1, the salt extraction level is very good except for magnesium, which, with its 76-pm ionic radius and its high hydrophily, does not fit the extracting envelope of this 16-atom macrocycle, being still too large. Thus, this formulation seems to be well suitable for a massive desalination of a saline water, even of a brine (a water whose salinity is higher than 50 g/Liter).

Example 2: Extraction of Salts from a Brine by Using CEM1

The extracting composition is as follows: 0.4 Mol/L of CEM1 (cf example 1, of CAS #: 114155-16-7), completed with 1.2 Mol/L of ASM9 of formula:

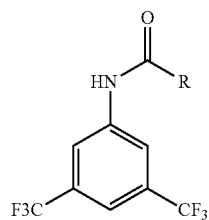

where R is the heptyl radical: $n\text{-}C_7H_{15}$.

This compound was synthetized by the method described in example 9 below.

The fluidizing agent used to solubilize these two compounds is 1,2-dichlorobenzene, of CAS #95-50-1 bought at TCI-Chemicals and identified by the initials 12ClPh.

The brine is a water having a high salinity, at 180 g/Liter (that is to say 5.6 Mol/L), composed of sodium, potassium, calcium, magnesium and chloride ions in the proportions of table II below. The saline water to be treated was contacted with a triple relative volume of this extracting composition in order to get close to the operating conditions.

It is shown in table II below the concentrations, in mMol/L of water, of each of the ions before and after each of the four extraction steps, carried out at room temperature (RT).

TABLE II

| CEM1 | 0.4M | | Salinity progression at RT, in mMol/Liter | | | | | |
|---|---|---|---|---|---|---|---|---|
| ASM9 | 1.2M | | Na | K | Mg | Ca | Cl | Total |
| Fluidizing agent | 12ClPh | Initial | 1650 | 20.8 | 77.1 | 447 | 3432 | 5626 |
| Org./Water | 3 | Extract 1 | 1162 | 22.5 | 83.4 | 495 | 2703 | 4466 |
| | | Extract 2 | 429 | 23.4 | 86.4 | 492 | 2292 | 3322 |
| | | Extract 3 | 8.54 | 13.9 | 87.6 | 360 | 1083 | 1553 |
| | | Extract 4 | 3.70 | 3.65 | 94.2 | 114 | 469 | 685 |
| Equivalent4 | | g/Liter | 0.09 | 0.14 | 2.29 | 4.57 | 16.62 | 23.70 |

This data is illustrated by FIG. 1. It clearly appears that the first salt to be extracted is NaCl, then from the third extraction step, calcium and potassium chlorides start to be extracted while NaCl continues its decrease in concentration in water. Not surprisingly, magnesium is not extracted. In the end, after 4 contacting and mixing phases between liquid phases, the total salinity of water transitioned from 180 g/Liter to 23.7 g/Liter. A fifth extraction would have allowed to achieve a complete desalination, except for $MgCl_2$.

Example 3: Extractions at Room Temperature of Mono-Salt Saline Solutions with CEM2

This example 3 is carried out in the same conditions as example 1 except that CEM1 is replaced with CEM2.

The CEM used is 4-tert-butyl-Calix[6]arene hexakis(N, N-diethylacetamide (CEM2 of CAS #: 111786-95-9).

It was synthesized internally from 4-tert-Butylcalix[6]arene of molecular formula $C_{66}H_{84}O_6$ and of CAS #78092-53-2, bought at TCI Chemicals, according to the synthesis procedure described in the publication «Selective Complexation and Membrane Transport of Guanidinium Salts by Calix[6]arene Amides, Israel J. Chem, 1992, 32, 79-87 ».

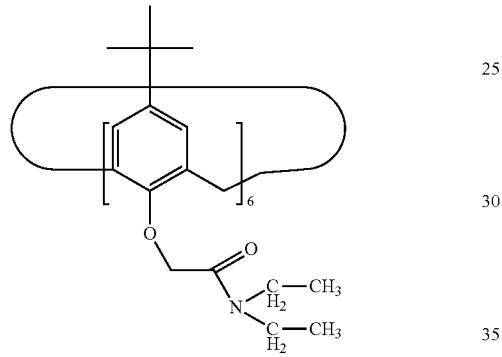

The ASM used is ASM2 of CAS #32707-89-4, $C_9H_6F_6O$, MW=244.13 g/mol, a white solid which is available for purchase from several distributors.

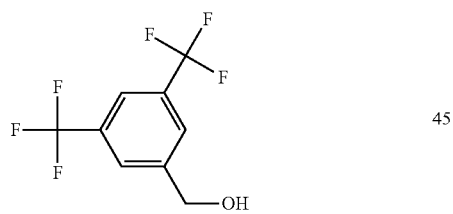

After carrying out the 7 specific extractions (duplicated) of salts, the amounts of extracted cations in relative molar percentage before and after extraction at room temperature and at water/extracting formulation iso-volume are indicated in table III:

TABLE III

| CEM2 | 0.1M | Extraction rate at room temperature (RT) (Org./Water = 1) | | | | | | |
|---|---|---|---|---|---|---|---|---|
| ASM2 | 3.52M | LiCl | NaCl | KCl | $MgCl_2$ | $CaCl_2$ | $SrCl_2$ | $BaCl_2$ |
| Fluidizing agent | $CH_2Cl_2$ | 21.9% | 22.7% | 25.4% | 13.5% | 57.8% | 63.8% | 63.2% |

Figure 2:
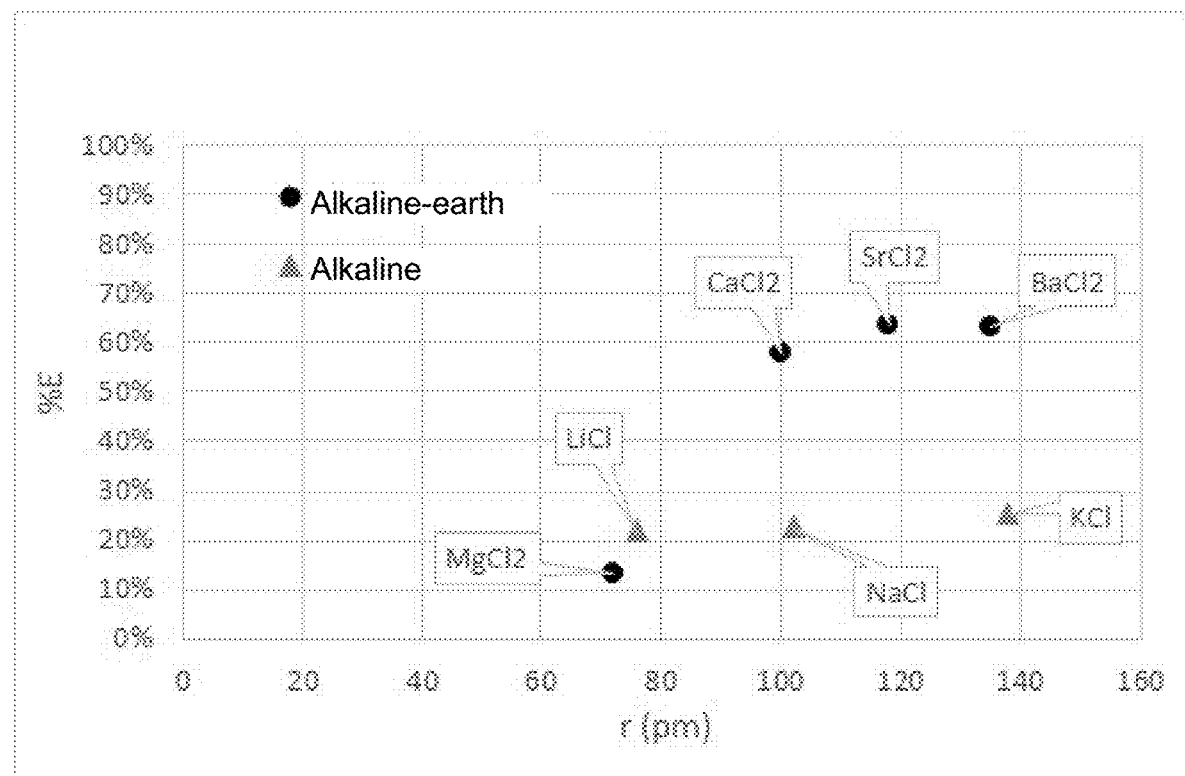
FIG. 2 is a graph showing the extraction rates in molar %, at room temperature, of 7 salts, LiCl, NaCl, KCl, $MgCl_2$, $CaCl_2$, $SrCl_2$ and $BaCl_2$ individually extracted from a salt water the initial concentration of which was 0.1 Mol/L by using a composition containing 0.1 Mol/L of CEM2 and 3.5 Mol/L of ASM2, the whole dissolved in dichloromethane according to the invention, expressed according to the cation ionic radius, as described in example 3.

The extraction of cations from a brine composed of only one alkaline or alkaline-earth chloride thus varies from 13.5% to 63.8% depending on the cation. In these mono-salt solutions, the divalent cations are extracted in an amount which is twice to three times as high as that of the monovalent cations, except for $Mg^{2+}$ magnesium ion, which is much more hydrophilic and much smaller, and which is extracted with difficulty as shown in FIG. 2.

The composition according to the invention thus demonstrates a particularly interesting specificity of this formulation for many industrial applications in which calcium, although it is more hydrophilic than sodium (($\Delta G°hyd=-$1515 kJ/mol versus$-$406 kJ/mol), in spite of their ionic radius being very close to each other (102 and 100 pm), is extracted from water 2.54 times more in their respective chloride forms.

Example 4: Characterization of an Extracting Composition Including CEM2 for the Extraction of $CaCl_2$)

This series of examples aims to establish two extraction isotherms of $CaCl_2$ at 20° C. and at 80° C. for an extracting composition including 0.1 Mol/L of CEM2, combined with 1 Mol/L of ASM9; the whole dissolved in 1,2-dichlorobenzene.

After carrying out the 7 specific extractions (duplicated) of salts, the amounts of extracted cations in relative molar percentage before and after extraction at room temperature and at water/extracting formulation iso-volume are indicated in table IV:

TABLE IV

| CEM2 | 0.1M | Extraction rate at room temperature (RT) (Org./Water = 1) | | | | | | |
|---|---|---|---|---|---|---|---|---|
| ASM9 | 1M | 0.01M | 0.02M | 0.03M | 0.04M | 0.1M | 0.2M | 0.4M |
| Fluidizing agent | 12ClPh | 39% | 42% | 41% | 40% | 34% | 27% | 16% |

The same series of extractions was then carried out at 80° C. to give table V as follows:

TABLE V

| CEM2 | 0.1M | Extraction rate at 80° C. (Org./Water = 1) | | | | | | |
|---|---|---|---|---|---|---|---|---|
| ASM9 | 1M | 0.01M | 0.02M | 0.03M | 0.04M | 0.1M | 0.2M | 0.4M |
| Fluidizing agent | 12ClPh | 11% | 16% | 18% | 17% | 18% | 16% | 10% |

Figure 3:
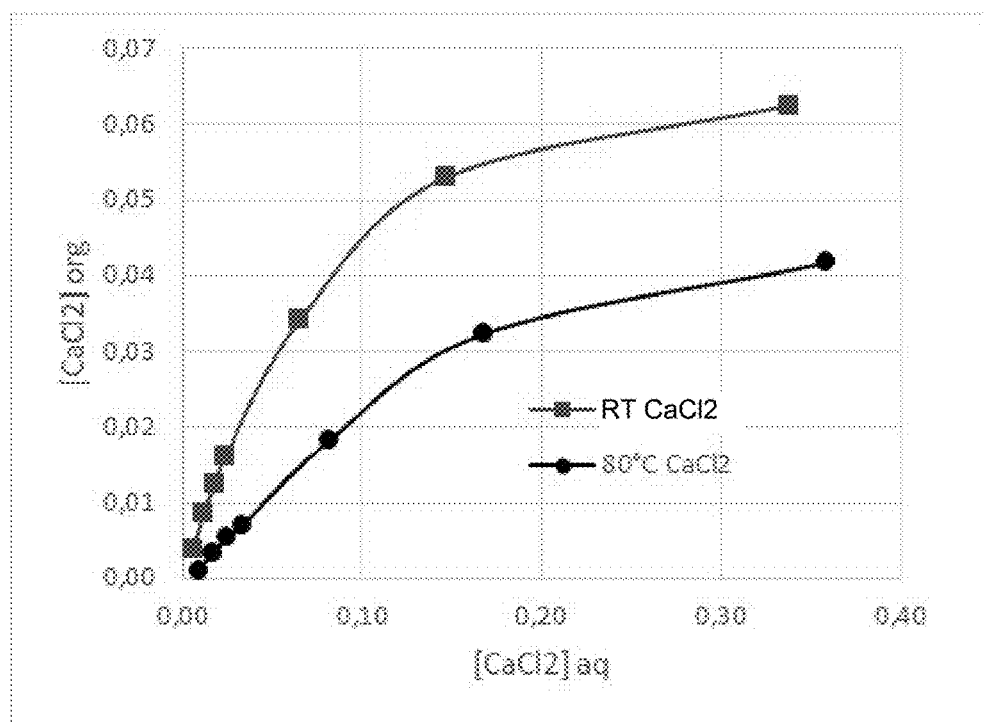
FIG. 3 is a graph showing the absorption isotherms of $CaCl_2$) at room temperature and at 80° C. of a composition containing 0.1 Mol/L of CEM2 and 1 Mol/L of ASM9, the whole dissolved in 1,2-dichlorobenzene according to the invention, as described in example 4.

The extraction temperature has a high influence over the extraction performance. From these studies, and from the collected data, it was possible to plot these absorption isotherms in FIG. 3 as a function of concentrations in Mol/Liter. The axis of abscissa shows the concentration of NaCl in water and the axis of ordinates shows the concentration of NaCl in organic phase, at the absorption equilibrium.

The liquid-liquid extraction process of salt according to the invention is exothermic in terms of absorption and endothermic in terms of regeneration, which allows a thermal regeneration, with hot water, of the extracting organic composition.

Example 5: Extracting Process Including Thermal Regeneration of the Extracting Composition Comprising CEM2 and Related Impacts on the Desorption of $CaCl_2$)

Figure 4:
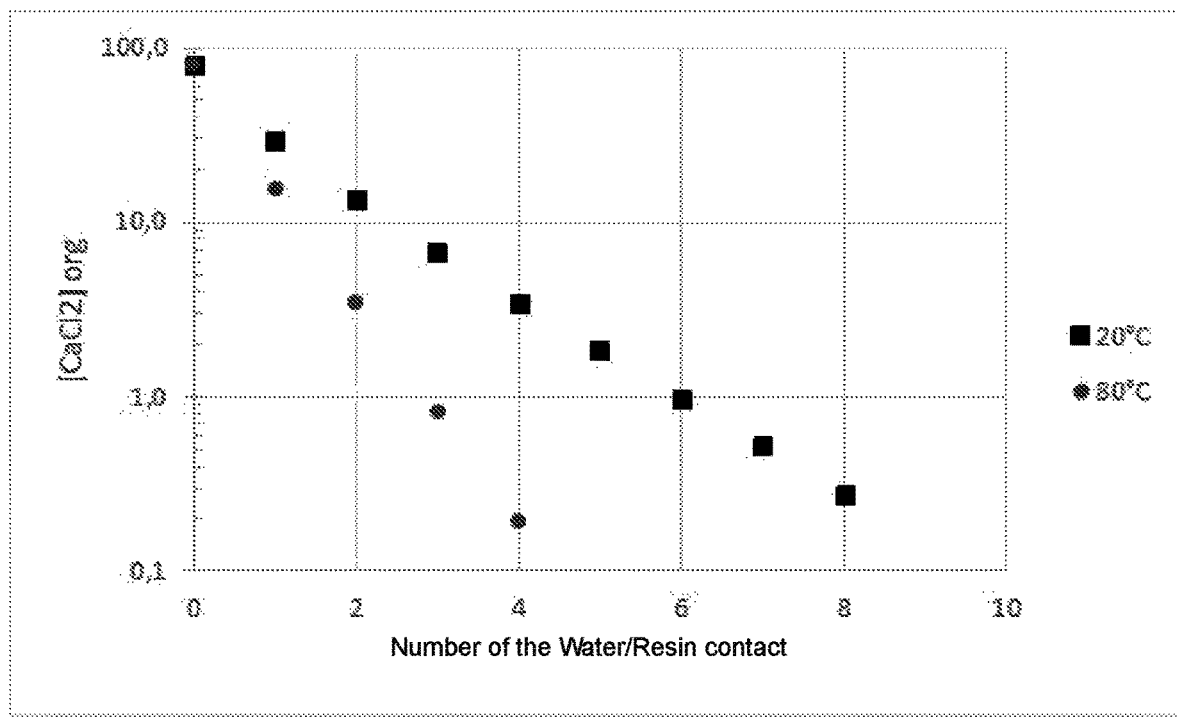
FIG. 4 is a graph showing a comparison of two regeneration phases at 20° C. and at 80° C. of a composition containing 0.1 Mol/L of CEM2 and 1 Mol/L of ASM9, the whole dissolved in 1,2-dichlorobenzene according to the invention, which was charged with up to 80 mMol/L of $CaCl_2$) before initiating several successive back-extraction phases with distilled water, as described in example 5.

Two samples of the extracting composition of example 4 with the highest content of $CaCl_2$ at 20° C. were contacted with a saline water at 1 Mol/L of $CaCl_2$ at room temperature to increase the salt charging level of the dissolved CEM2 cation extracting molecules, and thus to get close to their salt saturation level (0.1 Mol/L). Then, these two samples were contacted with an iso-volume of distilled water at 20° C. and stirred. One of the two diphasic samples was then heated up to 80° C. and kept under stirring. The initial salt charging level being assessed at 80 mMol/L, it appears that the latter drops to 15.27 mMol/L from the first regeneration step at 80° C. whereas, during regeneration at 20° C., the salt residual concentration is 29.3 mMol/L. FIG. 4 illustrates the results obtained throughout several serial steps of contacting the hydrophobic organic liquid phase charged with salts with an iso-volume of distilled water. The hot regeneration of the extracting composition is much more effective because of a 2-fold reduction in the number of necessary regeneration steps to achieve the same $CaCl_2$ overall back-extraction rate. In use, this advantage seems to be even more significant when a resin with a high CEM content, and thus a high salt content, is implemented.

Increasing the regeneration temperature allows to reduce the number of successive steps for contacting a distilled water at iso-volume while allowing a larger back-extraction of salts each time. It also allows to access regeneration waters with a higher concentration of back-extracted salts because of the use of a lesser regeneration water volume.

Example 6: Comparative Examples: Selective Extractions, at Room Temperature, of Cations from a Binary Mixture of Salts NaCl/$CaCl_2$)

A brine containing an equimolar mixture of salts, 0.05 mol/L of NaCl and $CaCl_2$ each, which was made as described above, was contacted with two extracting compositions, one of which according to the invention.

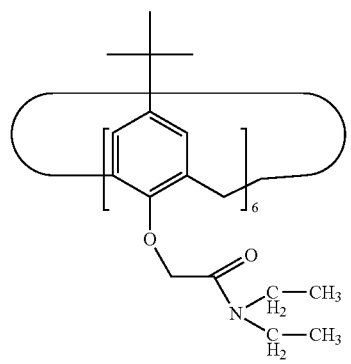

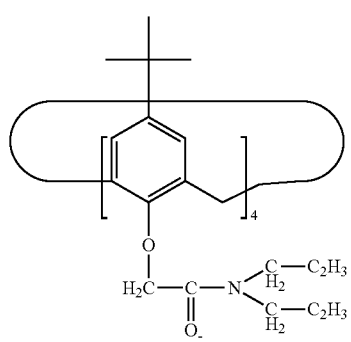

These compositions only differ from each other by the CEM compound used which is still from the disubstituted primary amide family but whose macrocycle size is changed, thereby being 16 carbon atoms (CEM1) and 24 carbon atoms (CEM2) in size, respectively. These compositions are obtained according to the process as described above.

Each extracting composition comprises 0.1 mol/L of CEM

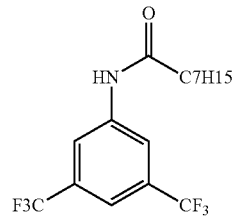

and 2.4 mol/L of ASM9 in 1,2-dichlorobenzene.

1,2-dichlorobenzene (CAS #: 95-50-1), having a purity higher than 99%, comes from TCI Chemicals.

The amounts of cations, in molar percentage, which were extracted from the mixture are indicated in table VI:

TABLE VI

| CEM1/CEM2 | Cations | $Na^+$ | $Ca^{++}$ |
|---|---|---|---|
| 4-tert-ButylCalix[4]$CH_2$C(=O)$NEt_2$ | % E | 88.0% | 10.0% |
| 4-tert-ButylCalix[6]$CH_2$C(=O)$NEt_2$ | % E | 4.0% | 56.0% |

Depending on the selected CEM, in a mixture of salts, the extraction of these cations experiences an increased selectivity where the cation which is the most extracted as a pure substance becomes mostly extracted as a mixture of salts. Here, the co-absorption is favorable to the extraction which was initially the best. In particular, the formulation including CEM2 the carbon ring of which has 24 units, has a calcium to sodium extraction rate which is 14 times higher in a mixture with an iso-concentration of cations compared to a rate of 2.54 for solutions containing only one of these salts (cf examples 1 & 3). Such extraction capacities have many industrial applications in water descaling.

Example 7: Selective Extractions, at Room Temperature, of Cations from a Binary Mixture of Salts NaCl and $CaCl_2$ at Differentiated Initial Concentrations A brine containing a mixture of NaCl and $CaCl_2$ is made as described above to obtain the following initial saline concentrations in a mixture: 0.2 Mol/L of NaCl and 0.03 Mol/L of $CaCl_2$. The extracting resin, is composed of 0.1 Mol/L of CEM2, 3.52 Mol/L of ASM2 and a complement of liquid ASM1, which is also used as a fluidizing agent.

The amounts of cations, in molar percentage, which were extracted from the mixture are indicated in table VII:

TABLE VII

| CEM2 | Cations | $Na^+$ | $Ca^{++}$ |
|---|---|---|---|
| 4-tert-ButylCalix [6] $CH_2$C (=O) $NEt_2$ | % E | 5.0% | 88.0% |

Here, it appears that the ratio of the Ca/Na extraction rates is 17.6, which accredits one of the objects of the invention because of an improvement of the differences during the extraction of multiple salts, in the presence of a common anion.

Example 8: Selective Extractions, at Room Temperature, of Cations from a Mixture of Four Salts NaCl, CaCl₂, SrCl₂ and BaCl₂

A brine containing a mixture of NaCl, CaCl$_2$, SrCl$_2$ and BaCl$_2$ is made as described above. The dissolved salt concentrations are indicated in table VIII in mMol/L. The extraction was carried out a second time with changed divalent salt concentrations. The dissolved salt concentrations are indicated in table IX in mMol/L.

The extracting composition consists of 0.1 Mol/L of CEM2 and of a mixture of two ASMs. This mixture is composed of ASM2 which is usually referred to as [3,5-Bis(Trifluoromethyl)benzyl Alcohol](35TFMBnOH) of CAS #: 32707-89-4, up to 60% by volume, and of ASM1, referred to as [3-(Trifluoromethyl)benzyl Alcohol](3TFMBnOH), of molecular formula C$_8$H$_7$F$_3$O of MW=176.14 g/Mol and of CAS #: 349-75-7, up to 40% by volume, both serving as a fluidizing agent and as an ASM given its liquid form.

The extraction is carried out as described in example 1 and at room temperature.

The amounts of extracted cations, in molar percentage, are indicated in tables VIII and IX, respectively for initial and final ionic concentrations expressed in mMol/L.

TABLE VIII

| | CATIONS (mMol/L) | | | ANIONS Cl− (mMol/L) | |
|---|---|---|---|---|---|
| Cations | Initial Concentration | Final Concentration | % extraction | Initial Concentration | Final Concentration |
| Na⁺ | 193.52 | 199.4775 | 0% | 257.74 | 213.38 |
| Ca²⁺ | 29.13 | 0.4916 | 98% | | |
| Sr²⁺ | 4.29 | 0 | 100% | | |
| Ba²⁺ | 4.69 | 0 | 100% | | |

TABLE IX

| | CATIONS | | | ANIONS Cl− | |
|---|---|---|---|---|---|
| Cations | Initial Concentration | Final Concentration | % extraction | Initial Concentration | Final Concentration |
| Na⁺ | 196.04 | 195.9835 | 0% | 245.4 | 203.16 |
| Ca²⁺ | 9.25 | 0 | 100% | | |
| Sr²⁺ | 9.17 | 0 | 100% | | |
| Ba²⁺ | 9.32 | 0 | 100% | | |

Here, it appears that, for high relative concentrations of sodium with respect to these scaling divalent cations, an extraction selectivity of 100% can be achieved.

The selective extraction of the divalent cations demonstrates the capacity of these compositions according to the invention to efficiently fight against scale deposit and to purify water, because of a selective extraction of calcium Ca⁺⁺, strontium and barium.

Example 9: Synthesis of ASM9, ASM10, ASMC11 and ASM12 Compounds

Synthesis Diagram

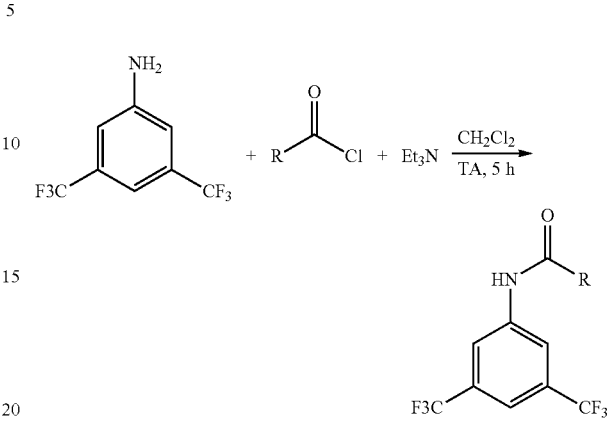

R=n-C$_7$H$_{15}$ (ASM9), n-C$_9$H$_{19}$ (ASM10), n-C$_{11}$H$_{23}$ (ASM11), n-C$_{13}$H$_{27}$ (ASM12).

Protocol

To a solution of 3,5-bis(trifluoromethyl)aniline (8.79 mL, 56.29 mmol, 1.0 eq.), dichloromethane (40 mL) and triethylamine (8.63 mL, 61.92 mmol, 1.1 eq.), the acid chloride (56.29 mmol, 1.0 eq.) is added dropwise under stirring. The temperature is controlled during the addition and should not exceed 38° C. (boiling point of dichloromethane). The reaction mixture is stirred for 5 h at room temperature. A solution of 1M HCl (50 mL) is added and then the organic phase is washed. The successive washes are carried out with a 1M HCl solution (50 mL) and a saturated NaCl solution (50 mL). The organic phase is dried over Na$_2$SO$_4$, filtered and the solvent is then evaporated under reduced pressure. The solid residue is then taken back with petroleum ether (cold or at room temperature), washed, filtered and then dried under vacuum to give the desired amide. The petroleum ether used is a mixture of hydrocarbons mainly composed of n-pentane, 2-methyl pentane of CAS #64742-49-0 from VWR, where it is sold under the name Petroleum Ether 40-60° C. GPR RECTAPUR. The characteristics of the compounds obtained are shown in table X.

| Table XR | Compound | Molar mass (g/mol) | T° petroleum ether | Yield | Aspect | Melting point |
|---|---|---|---|---|---|---|
| n-C$_7$H$_{15}$ | ASM9 | 355.3 | Cold (−20° C.) | 91% | White solid | 43-44° C. |
| n-C$_9$H$_{19}$ | ASM10 | 383.3 | Room temperature | 92% | White solid | 79-81° C. |
| n-C$_{11}$H$_{23}$ | ASM11 | 411.4 | Room temperature | 92% | White solid | 60-61° C. |
| n-C$_{13}$H$_{27}$ | ASM12 | 439.5 | Room temperature | 90% | White solid | 53-54° C. |

Figure 6:
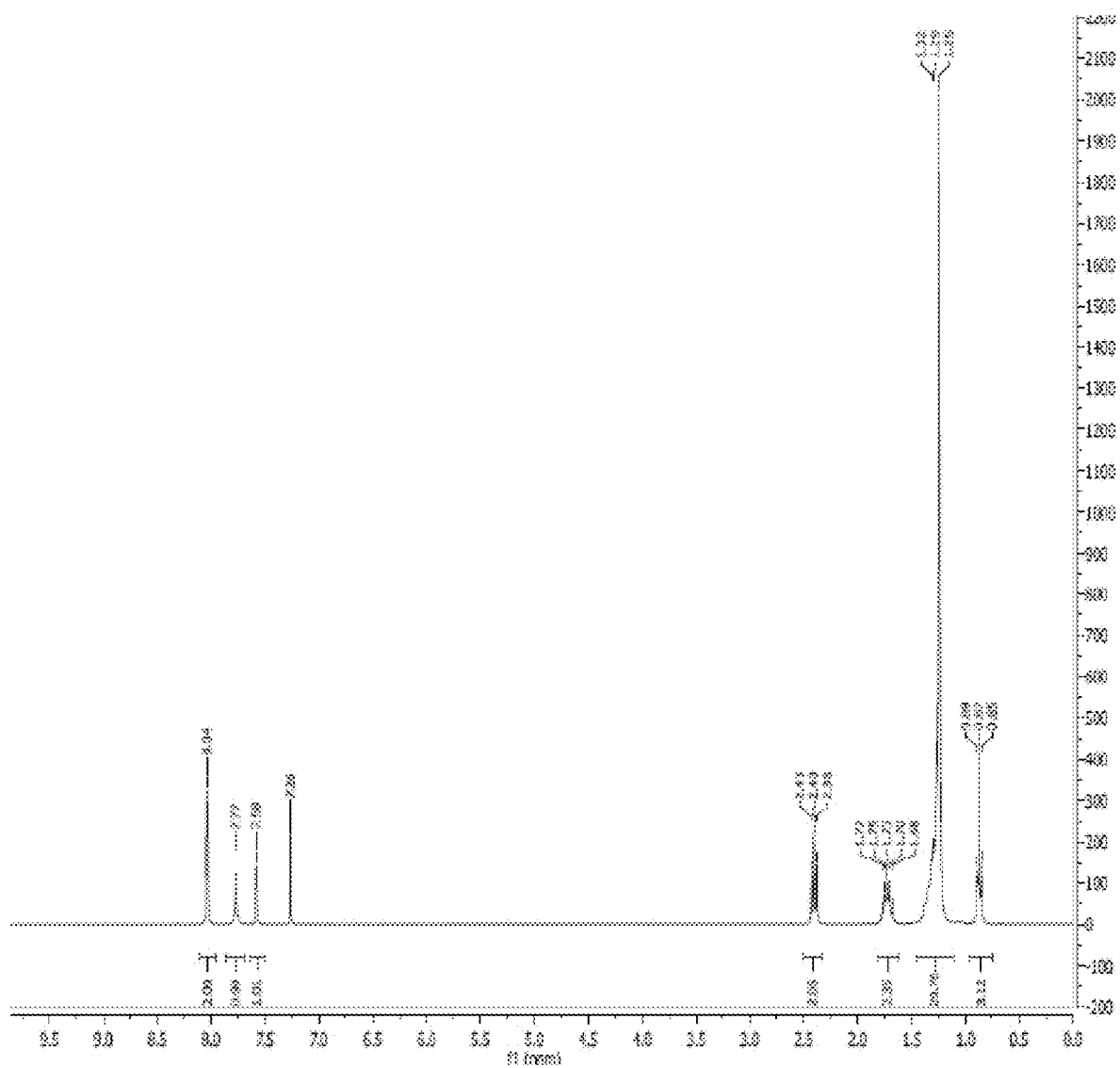
FIG. 6 shows the NMR spectrum of ASM11 compound.

The compounds ASM9, ASM10, ASMC11 and ASMC12 have the respective IUPAC names: N-[3,5-bis(trifluoromethyl)phenyl]octanamide, N-[3,5-bis(trifluoromethyl) phenyl]decanamide, N-[3,5-bis(trifluoromethyl)phenyl]dodecanamide, N-[3,5-bis(trifluoromethyl)phenyl] tetradecanamide and were furthermore identified by NMR spectrometry. FIG. 6 shows the NMR spectrum (CDCl$_3$, 300 MHz) of the ASM11 compound, the peaks of which are as follows: 1H NMR (CDCl$_3$, 300 MHz): δ (ppm)=0.87 (t, 3J=7.0 Hz, 3H), 1.20-1.35 (m, 20H), 1.73 (quint., 3J=7.0 Hz, 2H), 2.40 (t, 3J=7.0 Hz, 2H), 7.58 (s, 1H), 7.77 (bs, 1H), 8.04 (s, 2H).

Example 10: Extractions at Room Temperature of Mono-Salt Saline Solutions with CEM10

This example 10 is carried out in the same conditions as examples 1 and 3 except that the CEM in question is CEM10.

The CEM used is 4-tert-butyl-Calix[4]arene acid tetra-ethyl ester (CEM10 of CAS #: 97600-39-0).

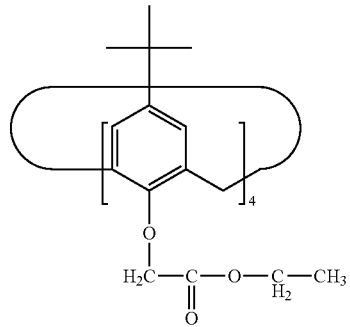

It was synthesized internally from 4-tert-Butylcalix[4]arene of molecular formula $C_{44}H_{56}O_4$ and of CAS #60705-62-6, and from ethyl bromoacetate of CAS #105-36-2, products bought at Sigma-Aldrich for the implementation of a conventional addition procedure on an alcohol, in a mixture THF/DMF at 5/1 by volume.

The ASM used is ASM2 of CAS #32707-89-4, $C_9H_6F_6O$, MW=244.13 g/mol, a white solid which is available from several distributors.

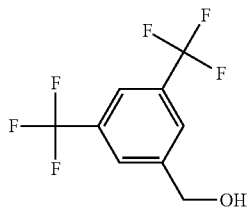 [SMILES: OCc1cc(C(F)(F)F)cc(C(F)(F)F)c1]

After carrying out the 7 specific extractions (duplicated) of salts, the amounts of extracted cations in relative molar percentage before and after extraction at room temperature and at water/extracting formulation iso-volume are indicated in table XI:

TABLE XI

| CEM10 | 0.1M | Extraction rate at room temperature (RT) (Org./Water = 1) | | | | | | |
|---|---|---|---|---|---|---|---|---|
| ASM2 | 3.52M | LiCl | NaCl | KCl | $MgCl_2$ | $CaCl_2$ | $SrCl_2$ | $BaCl_2$ |
| Fluidizing agent | $CH_2Cl_2$ | 5.5% | 66.2% | 14.4% | 5.1% | 4.7% | 5.9% | 3.7% |

The extraction of cations from a brine composed of only one alkaline or alkaline-earth chloride thus varies from 3.7% to 66.2% depending on the cation. In these mono-salt solutions, it appears that CEM10 is selective for sodium chloride among the alkaline cations and that the divalent cations are poorly extracted with a Na/Ca selectivity of 14.

The composition according to the invention thus demonstrates a particularly interesting specificity of this formulation for industrial applications in relation to chlorine chemistry where NaCl can be extracted from a seawater or from a brine in a selective way in order to supply the electrolysers for producing NaOH, HCl, or even $Cl_2$.

Example 11: Extractions at Room Temperature of Mono-Salt Saline Solutions with CEM12

This example 11 is carried out in the same conditions as examples 1, 3 and 10 except that the CEM in question is CEM12.

The CEM used is 4-tert-butyl-Calix[6]arene acid hexa-ethyl ester (CEM12 of CAS #: 92003-62-8).

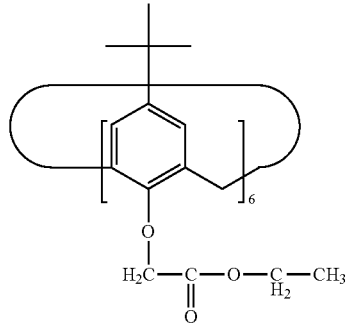

It was synthesized internally from 4-tert-Butylcalix[6]arene of molecular formula $C_{66}H_{84}O_6$ and of CAS #78092-53-2, and from ethyl bromoacetate of CAS #105-36-2, products bought at Sigma-Aldrich for the implementation of a conventional addition procedure on an alcohol, in a mixture THF/DMF at 5/1 by volume.

The ASM used is ASM2 of CAS #32707-89-4, $C_9H_6F_6O$, MW=244.13 g/mol, a white solid which is available from several distributors.

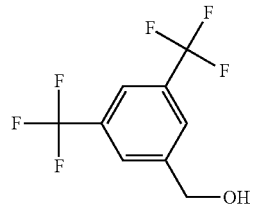

After carrying out the 7 specific extractions (duplicated) of salts, the amounts of extracted cations in relative molar percentage before and after extraction at room temperature and at water/extracting formulation iso-volume are indicated in table XII:

TABLE XII

| CEM12 | 0.1M | Extraction rate at room temperature (RT) (Org./Water = 1) | | | | | | |
|---|---|---|---|---|---|---|---|---|
| ASM2 | 3.52M | LiCl | NaCl | KCl | $MgCl_2$ | $CaCl_2$ | $SrCl_2$ | $BaCl_2$ |
| Fluidizing agent | $CH_2Cl_2$ | 9.0% | 29.6% | 55.7% | 5.4% | 5.5% | 4.6% | 11.8% |

The extraction of cations from a brine composed of only one alkaline or alkaline-earth chloride thus varies from 4.6% to 55.7% depending on the cation. In these mono-salt solutions, it appears that CEM12 is selective for the alkaline chloride salts having a larger diameter and that the divalent cations are poorly extracted with a K/Ca selectivity of 10.2, and which must be even better for Rb+ and Cs+ because this CEM12 is known as being a good cesium ionophore. The invention is not limited to the embodiments presented and other embodiments will become apparent to those skilled in the art. In particular, it is possible to combine several CEMs within an extracting formulation so as to allow to associate the specific performance of each CEM to obtain optimal overall performance.

The invention claimed is:

1. A process for deionizing water by extraction in a liquid medium with thermal regeneration, applied to the extraction of at least one alkaline cationic species and of a complementary anionic species from a saline liquid aqueous solution, the saline liquid aqueous solution comprising:
    a salt of the at least one alkaline cationic species, and
    a salt of a cationic species of an alkaline earth metal, the process comprising the following steps:
    a) mixing in a first reactor, at a first temperature, a liquid hydrophobic organic phase and the saline liquid aqueous solution, in order to subsequently obtain a treated liquid aqueous solution and a liquid hydrophobic organic phase charged with the at least one alkaline cationic species and the complementary anionic species,
    the liquid hydrophobic organic phase comprising an extracting molecule of the at least one alkaline cationic species, a solvating molecule of the complementary anionic species;
    b) separating the treated liquid aqueous solution and the liquid hydrophobic organic phase charged with the at least one alkaline cationic species and the complementary anionic species; and
    c) mixing in a second reactor, the liquid hydrophobic organic phase, charged with the at least one alkaline cationic species and the complementary anionic species, with a regeneration liquid aqueous solution, in order to subsequently obtain a regenerated liquid hydrophobic organic phase and a regeneration liquid aqueous solution charged with the at least one alkaline cationic species and the complementary anionic species, the difference between the first and second temperatures varying from 30° C. to 150° C.;
    wherein the extracting molecule of the at least one alkaline cationic species is a macrocycle, the cycle of which is formed from 16 to 24 atoms and functionalized with ester or ketone groups.

2. The process according to claim 1, wherein the extracting molecule of the at least one alkaline cationic species is selected from the compounds of formulae (V) or (VI):

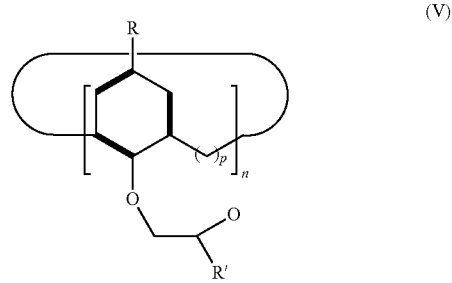

(V)

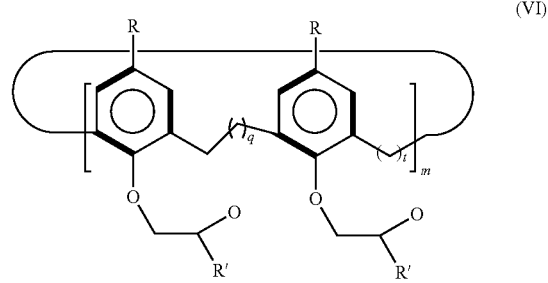

(VI)

where
n is 4, 5 or 6
p is 1 or 2,
m is 2 or 3,
q and t, identical or different, are 0, 1 or 2,
R is a tert-butyl, tert-pentyl, tert-octyl group, or a hydrogen atom,
R' is selected from the group constituted by methyl, ethyl, propyl, isopropyl, butyl, isobutyl, pentyl, hexyl, heptyl and octyl groups, in order to make a ketone-type binding group, or R' is selected from the group consisting of O-methyl, O-ethyl, O-propyl, O-isopropyl, O-butyl, O-isobutyl, O-pentyl, O-hexyl, O-heptyl, O-octyl, $OCH_2$-Phenyl groups in order to make an ester-type binding group.

3. The process according to claim 1, wherein the extracting molecule of the at least one alkaline cationic species is selected from the compounds of formula (V) with calixarene macrocycle, with p=1, and R, R' and n as defined below:

| R | R' | n |
|---|---|---|
| H | O-ethyl | 4 |
| H | O-isopropyl | 4 |
| H | O-tert-butyl | 4 |
| tert-butyl | O-ethyl | 4 |
| tert-butyl | O-isopropyl | 4 |
| tert-butyl | O-tert-butyl | 4 |
| tert-octyl | O-ethyl | 4 |
| tert-butyl | O-ethyl | 5 |
| tert-butyl | tert-butyl | 4 |
| tert-butyl | O-ethyl | 6. |

4. The process according to claim 1, wherein the extracting molecule has a complexing constant Log K, in methanol at 25° C., of the at least one alkaline cationic species to be extracted, higher than 3 and less than 11.

5. The process according to claim 1, wherein the at least one alkaline cationic species is selected from lithium, sodium, potassium, rubidium and cesium.

6. The process according to claim 1, wherein the process consists in a selective extraction of alkaline salts with hydrophilic anions.

7. The process according to claim 1, wherein the liquid hydrophobic organic phase comprises a fluidizing agent.

8. The process according to claim 7, wherein the fluidizing agent is selected from the aromatic polar solvents derived from dichlorobenzenes, dichlorotoluenes, derivatives thereof and mixtures thereof.

9. The process according to claim 1, wherein the solvating molecule of the complementary anionic species is a hydrophobic compound and, the pKa of which in water at 25° C. is at least 9, and is lower than the pKa of water at 25° C.

10. Process according to claim 1, wherein the solvating molecule of the complementary anionic species is a molecule of formula:

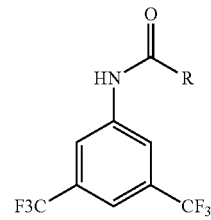

in which R is R=n-$C_7H_{15}$, n-$C_9H_{19}$, n-$C_{11}H_{23}$ or n-$C_{13}H_{27}$.

* * * * *